US012794097B2

(12) United States Patent
Liu et al.

(10) Patent No.: US 12,794,097 B2
(45) Date of Patent: Nov. 10, 2026

(54) SUSPENDED STRIP LINE, PHASE SHIFTER, AND BASE STATION

(71) Applicant: HUAWEI TECHNOLOGIES CO., LTD., Shenzhen (CN)

(72) Inventors: Xinming Liu, Xi'an (CN); Chunliang Xu, Xi'an (CN); Fuwei Lei, Xi'an (CN); Sen Yang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 568 days.

(21) Appl. No.: 18/327,069

(22) Filed: Jun. 1, 2023

(65) Prior Publication Data

US 2023/0307809 A1 Sep. 28, 2023

Related U.S. Application Data

(63) Continuation of application No. PCT/CN2020/140652, filed on Dec. 29, 2020.

(51) Int. Cl.
*H01P 1/18* (2006.01)
*H01P 5/16* (2006.01)

(52) U.S. Cl.
CPC ................ *H01P 1/184* (2013.01); *H01P 5/16* (2013.01)

(58) Field of Classification Search
CPC .. H01P 1/184; H01P 5/16; H01P 1/047; H01P 3/087; H01P 5/028; H01P 5/12
See application file for complete search history.

(56) References Cited

U.S. PATENT DOCUMENTS

| | | | | |
|---|---|---|---|---|
| 4,356,462 A * | 10/1982 | Bowman | .................. H01P 5/12 333/136 |
| 2004/0248468 A1 | 12/2004 | Gurovich et al. | |
| 2013/0076453 A1 | 3/2013 | Lai et al. | |

FOREIGN PATENT DOCUMENTS

| | | | |
|---|---|---|---|
| CN | 208986160 U | 6/2019 |
| CN | 110783666 A | 2/2020 |
| CN | 111478046 A | 7/2020 |
| EP | 3823089 A1 | 5/2021 |
| JP | 5152307 B2 | 2/2013 |
| WO | 2020024893 A1 | 2/2020 |

* cited by examiner

*Primary Examiner* — Andrea Lindgren Baltzell
*Assistant Examiner* — Kimberly E Glenn

(57) ABSTRACT

This disclosure relates to a component of a radio frequency functional device. The component can be a suspended strip line or any structure including the suspended strip line, which includes a cavity and a strip line located in the cavity. The strip line includes a signal processing line, a plurality of power branch lines, and a connector. The signal processing line has one end conducted to a signal source and another end electrically connected to the plurality of power branch lines separately. A first power branch line includes a first segment and a second segment that are disconnected from each other. One end of the first segment is electrically connected to the signal processing line. The second segment is located at one end of the first segment away from the signal processing line. The connector is located between the first segment and the second segment, to implement signal transmission between the first segment and the second segment.

18 Claims, 13 Drawing Sheets

SUSPENDED STRIP LINE, PHASE SHIFTER, AND BASE STATION

CROSS-REFERENCE TO RELATED APPLICATIONS

This application is a continuation of International Application No. PCT/CN2020/140652, filed on Dec. 29, 2020, the disclosure of which is hereby incorporated by reference in its entirety.

TECHNICAL FIELD

This disclosure relates to the field of wireless communication, and in particular, to a suspended strip line, a phase shifter configured with the suspended strip line, and a base station.

BACKGROUND

The suspended strip line is a strip line form in which a microstrip line is located in a shielding cavity, and has features such as low loss and easy assembly. The suspended strip line is usually used as a radio frequency functional device such as a power divider, a coupler, a filter, and a remote electrical tilt device, to implement transmission of a wireless microwave signal. Under a condition of a same electrical length, compared with an existing microstrip structure, signal transmission loss of the suspended strip line is lower, and transmission quality is better. A ratio of a physical length of a transmission line (strip line) to a wavelength of a transmitted electromagnetic wave is an electrical length.

However, due to a functional requirement, the existing suspended strip line has an excessively long extension path, which is prone to the defect of electrical function degradation. In addition, an excessively long suspended strip line further causes problems such as a higher processing difficulty and higher transportation and installation costs, limiting an application scenario of the suspended strip line.

SUMMARY

The disclosure provides a splicing-type suspended strip line structure, a phase shifter including the splicing-type suspended strip line structure, and a base station, to resolve a problem of electrical function degradation caused by an excessively long strip line. This disclosure specifically includes the following technical solutions.

According to a first aspect, this disclosure relates to a suspended strip line, including a cavity and a strip line. The strip line is located in the cavity, and is insulated from the cavity.

The strip line includes a signal processing line, a plurality of power branch lines, and a connector. One end of the signal processing line is conducted to a signal source, and another end is electrically connected to the plurality of power branch lines separately.

The plurality of power branch lines include a first power branch line. The first power branch line includes a first segment and a second segment that are disconnected from each other. One end of the first segment is electrically connected to the signal processing line. The second segment is located at one end of the first segment away from the signal processing line. The connector is located between the first segment and the second segment, to implement signal transmission between the first segment and the second segment.

According to the suspended strip line in this disclosure, the strip line is disposed in the cavity and insulated from the cavity, to implement shielding of the strip line. The signal processing line is electrically connected to the plurality of power branch lines through the signal processing line separately, to enable the signal source to transmit an electrical signal to each power branch line.

According to the suspended strip line in this disclosure, two disconnected segments of the first power branch line in the plurality of power branch lines are spliced, to implement a signal transmission function of the first power branch line. Specifically, in an extension direction of the first power branch line, a connector is disposed between the first segment and the second segment that are disconnected from each other. The connector cooperates with the first segment and the second segment separately, to implement transmission of an electrical signal on the first power branch line. To be specific, the electrical signal transmitted by the signal processing line on the first segment is transmitted to the second segment through the connector, and is propagated to a back end continuously, enabling the strip line in the suspended strip line in this disclosure to be disconnected based on implementation of a function. A separate length-width ratio of each part of the disconnected strip line is smaller than a length-width ratio of a strip line that extends integrally, thereby facilitating fabrication and maintaining consistency of the strip line. In addition, the disconnected strip line may also be assembled and combined later to form a complete suspended strip line structure, to reduce processing difficulty of the suspended strip line in this disclosure, and facilitate transportation and mounting of the suspended strip line.

In a possible implementation, the connector is conductive, and the connector includes a connection segment, a first pin, and a second pin. The first pin and the second pin are separately disposed at two ends of the connection segment. The first pin is fixed relative to the first segment, and the second pin is fixed relative to the second segment. The first pin and the second pin separately implement signal transmission between the first segment and the second segment in a conduction or coupling manner.

In this implementation, the first pin of the connector is relatively fixed to the first segment, and the second pin that is opposite to the first pin is relatively fixed to the second segment, to enable the two opposite pins of the connector to implement signal transmission with the first segment and signal transmission with the second segment separately. Then, the first pin and the second pin are conducted through the connection segment connected between the first pin and the second pin, to enable the electrical signal transmitted on the first segment can be successively transmitted to the second segment by the first pin, the connection segment, and the second pin, and then continue to be transmitted to a back end of the second segment.

In a possible implementation, a line width of the connection segment is less than or equal to a line width of the first segment and a line width of the second segment.

In this implementation, the line width of the connection segment is set to be less than or equal to the line width of the first segment, and is also less than or equal to the line width of the second segment. This enables the connector to implement impedance matching with the first segment and the second segment respectively during signal transmission, thereby reducing a signal loss caused by the connector.

In a possible implementation, the first pin and the first segment are conducted by welding, and the second pin and the second segment are also conducted by welding.

In this implementation, signal transmission is implemented separately between the connector and the first segment and between the connector and the second segment through welding conduction.

In a possible implementation, a length of the connection segment is greater than a linear distance between the first pin and the second pin.

In this implementation, the connection segment is in a shape of a curve or a fold line, or the connection segment includes a curve segment or a fold line segment. In this way, when the connector is welded to the first segment and the second segment separately, possible thermal stress deformation of the connector may be compensated through deformation of the connection segment, to ensure that the connection segment is fixedly connected to the first segment and the second segment separately.

In a possible implementation, an isolation pad is sandwiched between the first segment and the connector, an isolation pad is also sandwiched between the second end and the connector, and signal transmission is implemented between the first segment and the connector and between the second segment and the connector by coupling.

In this implementation, the connector and the first segment are fixed to each other through an isolation pad, and coupling is implemented. The connector and the second segment are also fixed to each other through an isolation pad, and coupling is also implemented. The electrical signal on the first segment is coupled twice by the connector and then transmitted to the second segment, to implement a function of transmitting the electrical signal to the back end of the second segment.

In a possible implementation, the suspended strip line further includes a first substrate and a second substrate that are relatively fixed. Both the first substrate and the second substrate are substrates of the printed circuit board. The signal processing line and the first segment are located on the first substrate, and the second segment is located on the second substrate.

In this implementation, the first power branch line is separately prepared on the first substrate and the second substrate, to form a structure of a printed circuit strip line. Mutual fixing between the first segment and the second segment is implemented through mutual fixing between the first substrate and the second substrate. A signal transmission function between the first segment and the second segment is implemented through the connector.

In a possible implementation, the first segment includes a first extension segment. The first extension segment is located at one end of the first segment away from the signal processing line. The second segment includes a second extension segment. The second extension segment is located at one end of the second segment close to the first segment.

The connector is insulated. The connector is disposed on a side of the first power branch line. The connector is configured to fix the first extension segment and the second extension segment, and implement signal transmission between the first extension segment and the second extension segment.

In this implementation, the connector fixes the first extension segment and the second extension segment, so that a relative position of the first extension segment to the second extension segment is fixed, and a function of transmitting an electrical signal from the first segment to the second segment can be implemented by cooperation between the first extension segment and the second extension segment.

In a possible implementation, the first extension segment and the second extension segment separately extend along a first direction, and the first direction and an extension direction of the first segment form an included angle.

In this implementation, the first extension segment and the second extension segment separately extend in a same direction. The first direction is different from the extension direction of the first segment, and is naturally different from an extension direction of the second segment. To be specific, the first extension segment is bent relative to the first segment, and the second extension segment is also bent relative to the second segment. In this way, the connector can fix positions of the first extension segment and the second extension segment, and a space area of the first power branch line is reduced.

In a possible implementation, an included angle formed between the first direction and the extension direction of the first segment is 90 degrees.

In this implementation, the extension direction of the first segment and the extension direction of the second segment are usually a same coherent direction. An included angle between the first direction and the coherent direction is set to be 90 degrees, both the first extension segment and the second extension segment are bent perpendicular to the direction. This helps the connector fix the first extension segment and the second extension segment at the same time and maintain signal transmission consistency between the first extension segment and the first segment and between the second extension segment and the second segment.

In a possible implementation, the connector includes a body, and a first through hole and a second through hole that are provided on the body. The body is fixedly connected to the first power branch line. The first through hole is configured to accommodate the first extension segment. The second through hole is configured to accommodate the second extension segment.

In this embodiment, the connector separately locates the first extension segment through the first through hole, and locates the second extension segment through the second through hole, to separately form effective holding for the first extension segment and the second extension segment, thereby ensuring a cooperative transmission function between the first extension segment and the second extension segment.

In a possible implementation, the first extension segment includes a first connection end extending out of the first through hole, the second extension segment includes a second connection end extending out of the second through hole, and the first connection end and the second connection end implement signal transmission between the first segment and the second segment in a conduction or coupling manner.

In this implementation, the first connection end and the second connection end respectively extend out of the first through hole and the second through hole. During cooperation between the first connection end and the second connection end, interference of another medium is not introduced between the first connection end and the second connection end. This helps implement impedance matching between the first extension segment and the second extension segment.

In a possible implementation, the first connection end and the second connection end are conducted through welding. The body is further provided with an accommodating cavity. The accommodating cavity is located on one side of the first through hole away from the first segment. The accommodating cavity connects the first through hole and the second through hole, and is configured to accommodate the first connection end and the second connection end.

In this implementation, the first connection end and the second connection end are welded and conducted, to implement an electrical signal transmission function. The accommodating cavity is disposed on one side away from the first segment. To be specific, the accommodating cavity is disposed corresponding to the first connection end and the second connection end. The accommodating cavity may protect the first connection end and the second connection end, and is further configured to accommodate solder formed between the first connection end and the second connection end.

In a possible implementation, the first connection end and the second connection end implement signal transmission through coupling, the first segment is formed on a first plane, and the first direction is perpendicular to the first plane.

In this implementation, because the first segment is formed on the first plane, a line width of the first segment is also expanded along the first plane. In this case, the first direction is set to be perpendicular to the first plane, and after the first extension segment is bent relative to the first segment, a line width direction of the first extension segment is directly opposite to the second extension segment. Correspondingly, when the second extension segment is bent along the first direction, the second extension segment is also bent in a posture of the line width direction facing the first extension segment. Therefore, in a coupling process between the first connection end and the second connection end, a relative function area of the first connection end and the second connection end is larger, to enable a better coupling effect to be implemented, thereby ensuring a transmission action of a signal.

In a possible implementation, a distance between the first connection end and the second connection end is less than or equal to 0.5 mm, and is greater than or equal to 0.1 mm.

In this implementation, a relative distance between the first connection end and the second connection end is controlled, to enable a capacitance value between the first connection end and the second connection end to be ensured, thereby reducing a signal loss when the first connection end is coupled to the second connection end.

In a possible implementation, a line width of the first extension segment is less than or equal to a line width of the first segment and a line width of the second segment.

A line width of the second extension segment is less than or equal to the line width of the first segment and the line width of the second segment.

In this implementation, the line width of the first extension segment is set to be less than or equal to the line width of the first segment, and is also less than or equal to the line width of the second segment. In addition, the line width of the second extension segment is also less than or equal to the line width of the first segment, and is also less than or equal to the line width of the second segment. This enables the first extension segment and the second extension segment to implement impedance matching with the first segment and the second segment respectively during signal transmission, thereby reducing a signal loss caused by the connector.

In a possible implementation, the strip line further includes a signal processing port and a plurality of signal transceiver ports. One end of the signal processing line away from the plurality of power branch lines is connected to the signal processing port. A quantity of the plurality of signal transceiver ports is the same as a quantity of the plurality of power branch lines. One end of each power branch line away from the signal processing line is connected to one signal transceiver port.

In this implementation, the signal processing line is connected to the signal processing port, to receive a signal source. Each power branch line outputs signals to the back end through a signal transceiver port connected to the power branch line, to implement a phase distribution function of the suspended strip line.

According to a second aspect, this disclosure provides a phase shifter, including the foregoing suspended strip line.

It may be understood that, because the phase shifter in this disclosure includes the foregoing suspended strip line, the phase shifter also has features of the foregoing suspended strip line, such as facilitating fabrication and maintaining consistency, relatively low processing difficulty, and facilitating transportation and mounting.

In a possible implementation, the phase shifter further includes a sliding medium. The sliding medium is also accommodated in the cavity and is slidable relative to the cavity. The sliding medium separately cooperates with each power branch line, and changes an electrical length of each power branch line by sliding, to implement a phase adjustment function.

According to a third aspect, this disclosure provides a base station, including the foregoing phase shifter.

It may be understood that, because the base station in this disclosure also includes the foregoing phase shifter, similar to the foregoing phase shifter, the base station in this disclosure has features of the suspended strip line, such as facilitating fabrication and maintaining consistency, relatively low processing difficulty, and facilitating transportation and mounting.

In a possible implementation, the base station further includes a baseband processing unit, a remote radio unit, and an antenna feeder system, where the foregoing phase shifter is disposed in the antenna feeder system. The remote radio unit is connected between the baseband processing unit and the antenna feeder system. The antenna feeder system is connected to the baseband processing unit by the remote radio unit, to implement a function of receiving and transmitting a radio signal.

Figure 4:
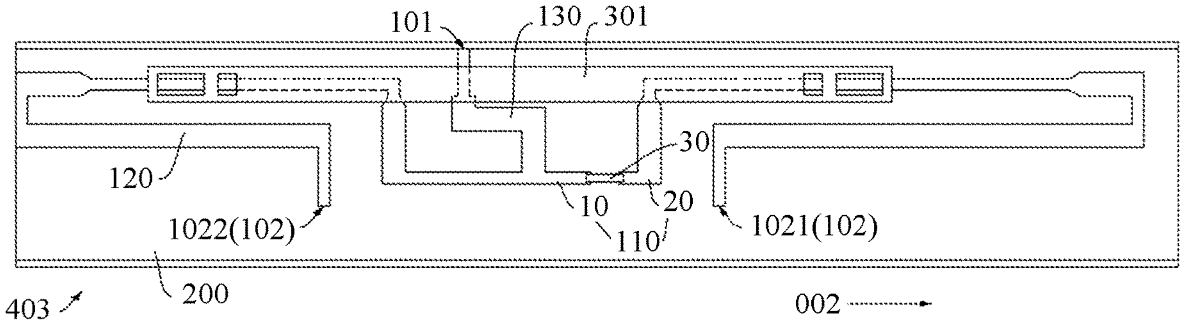
FIG. 4 is a schematic diagram of an internal structure of a phase shifter according to an embodiment of this disclosure.
Figure 5:
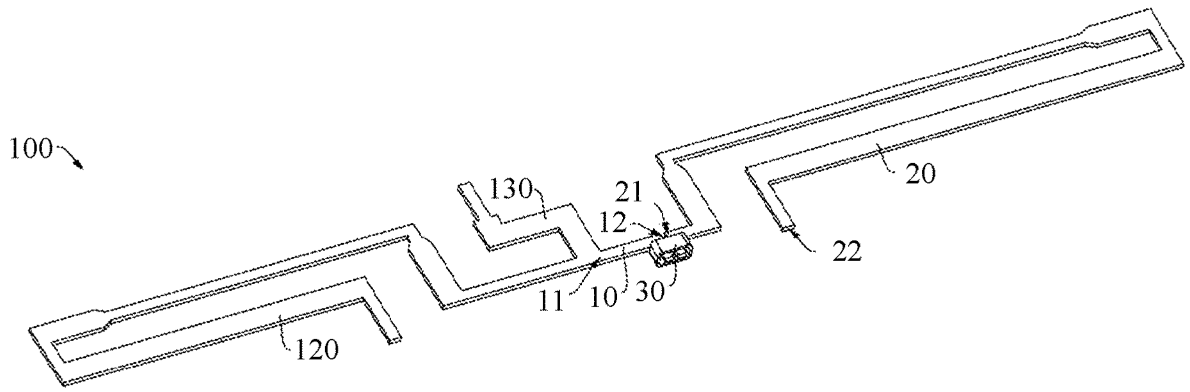
Figure 6:
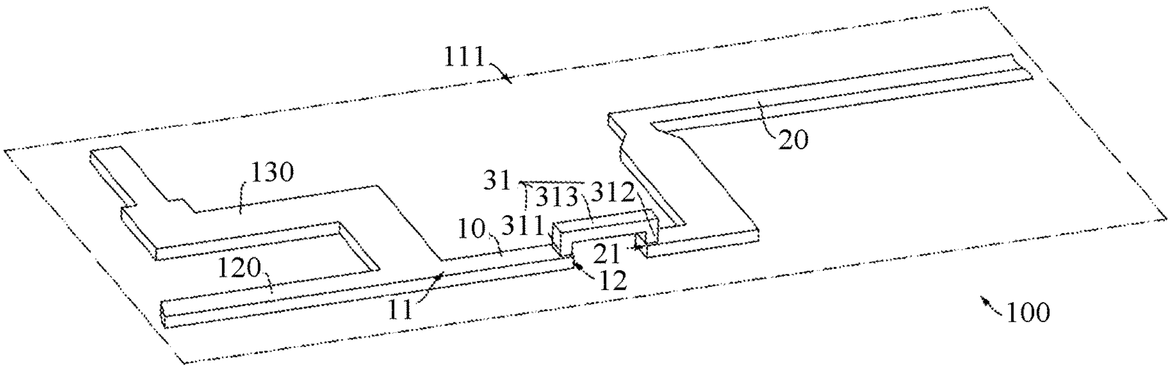
Figure 6A:
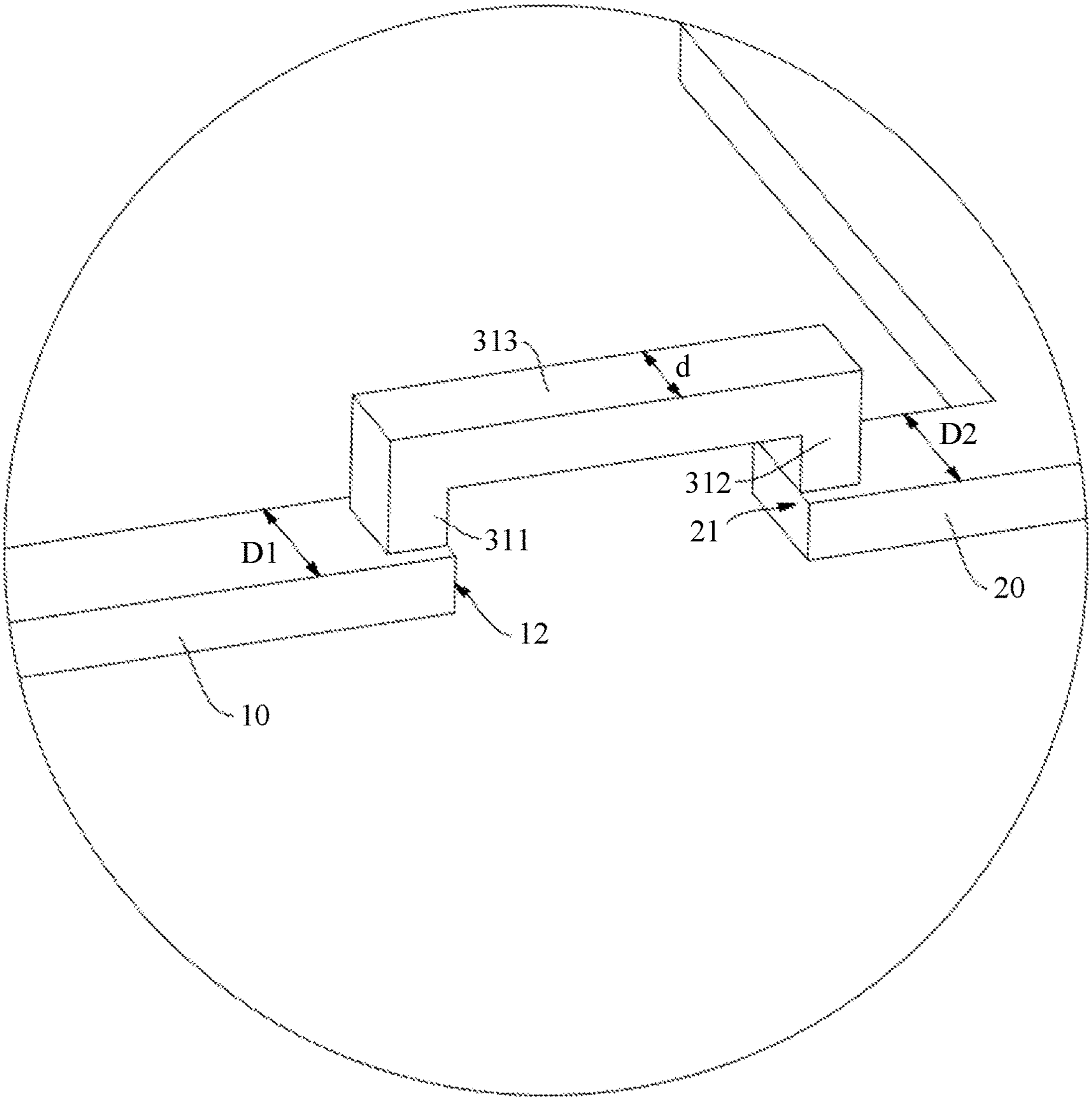
Figure 7:
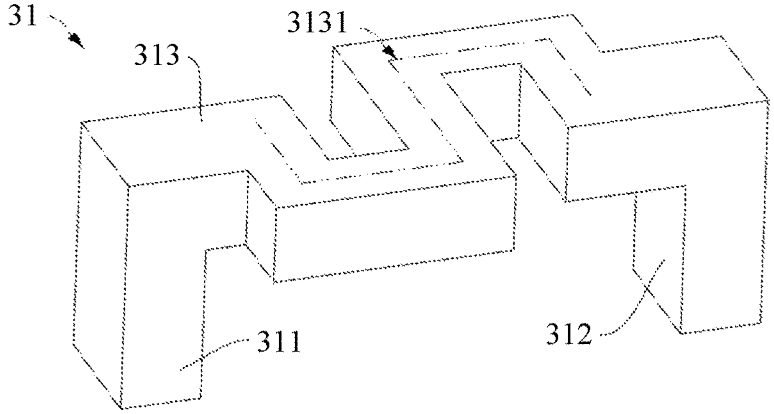
Figure 8:
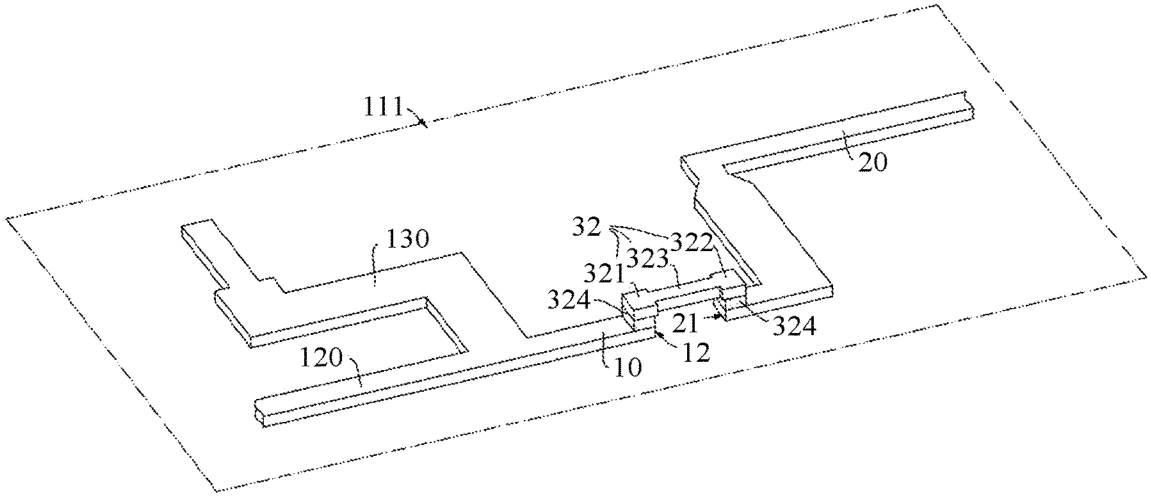
Figure 9:
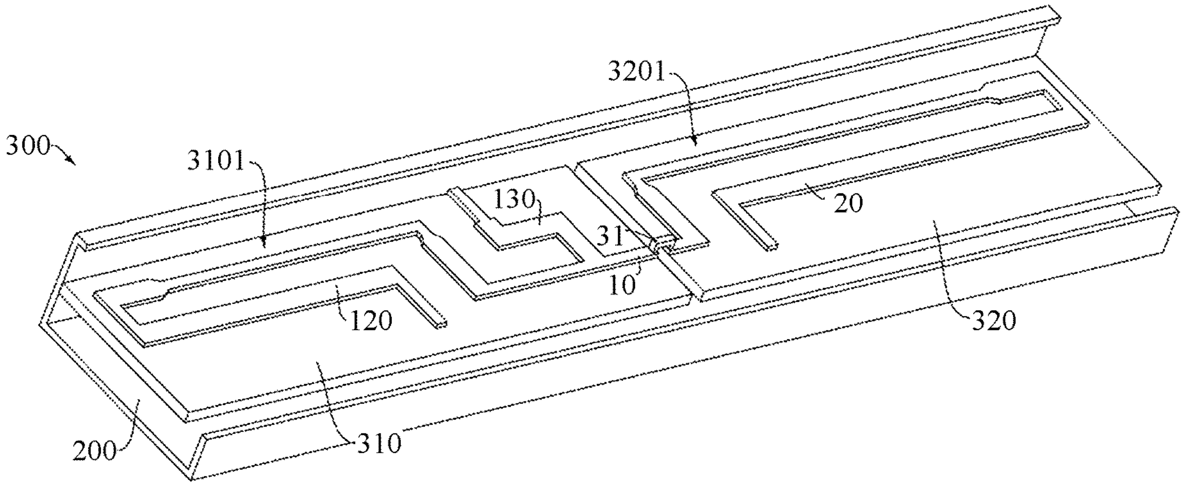
Figure 10:
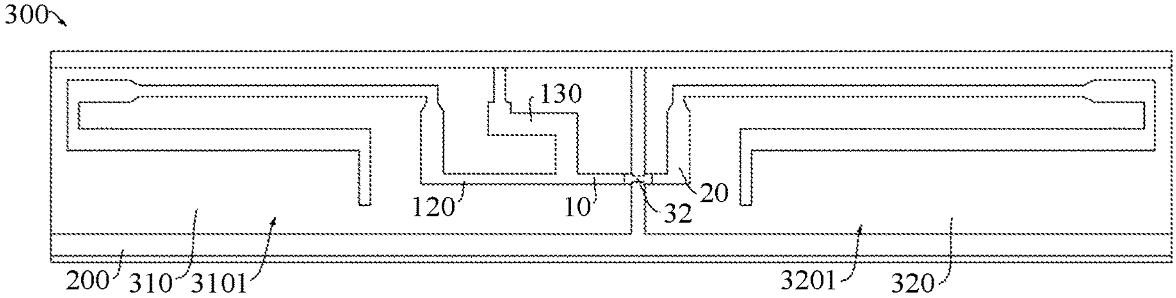
Figure 11:
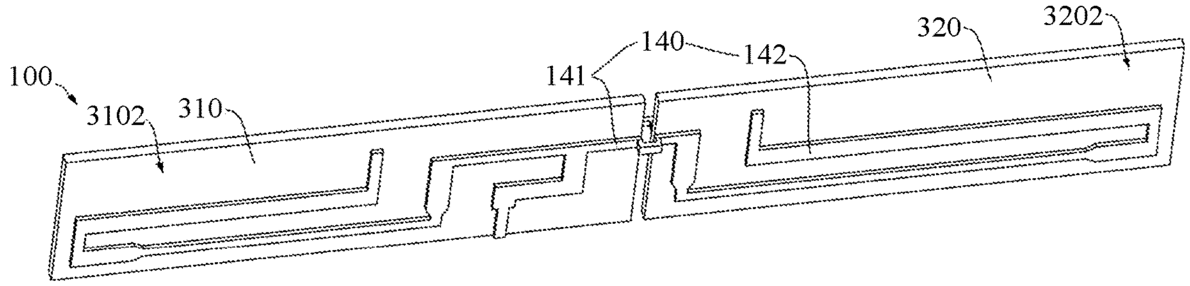
Figure 11A:
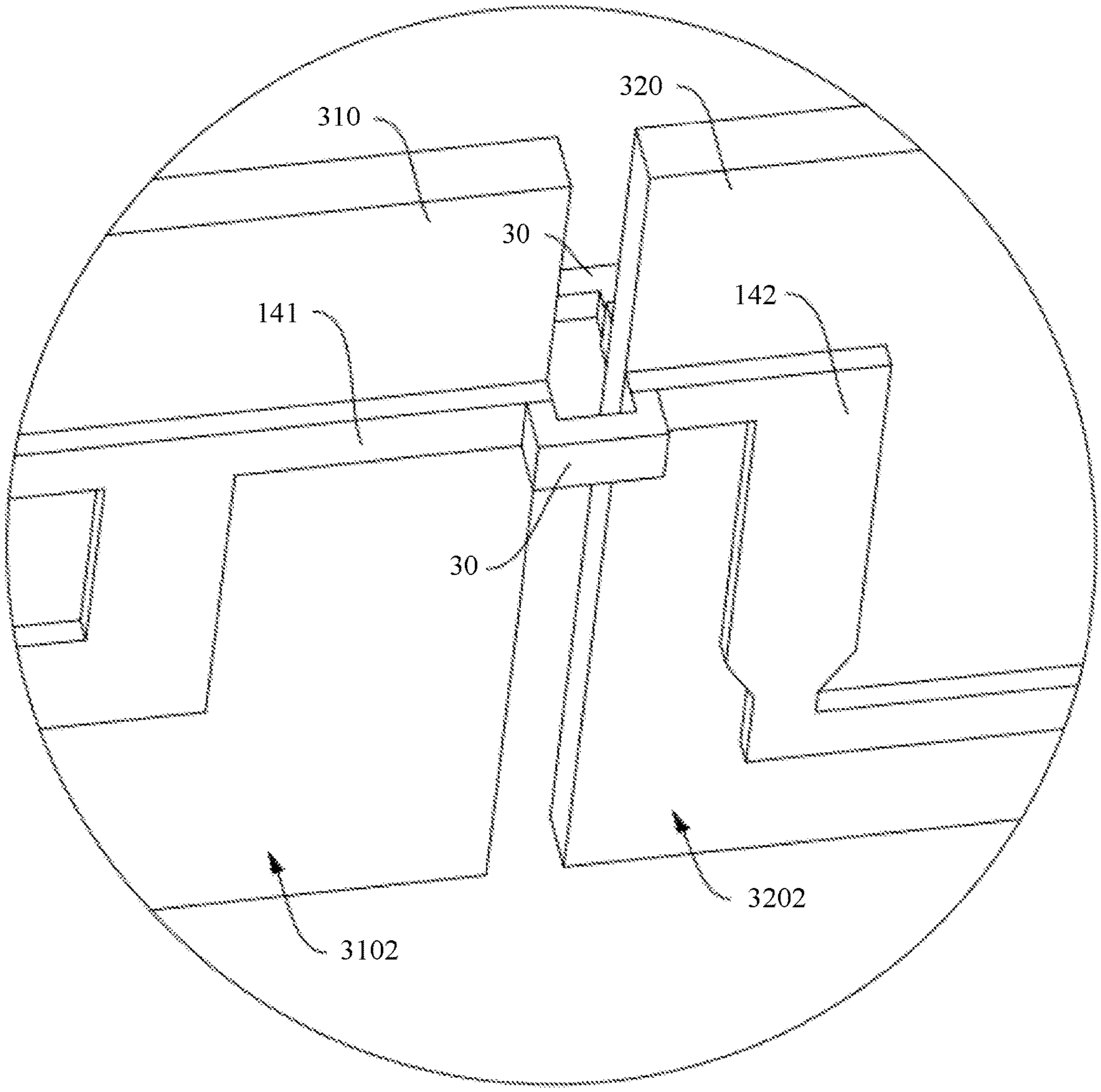
Figure 12:
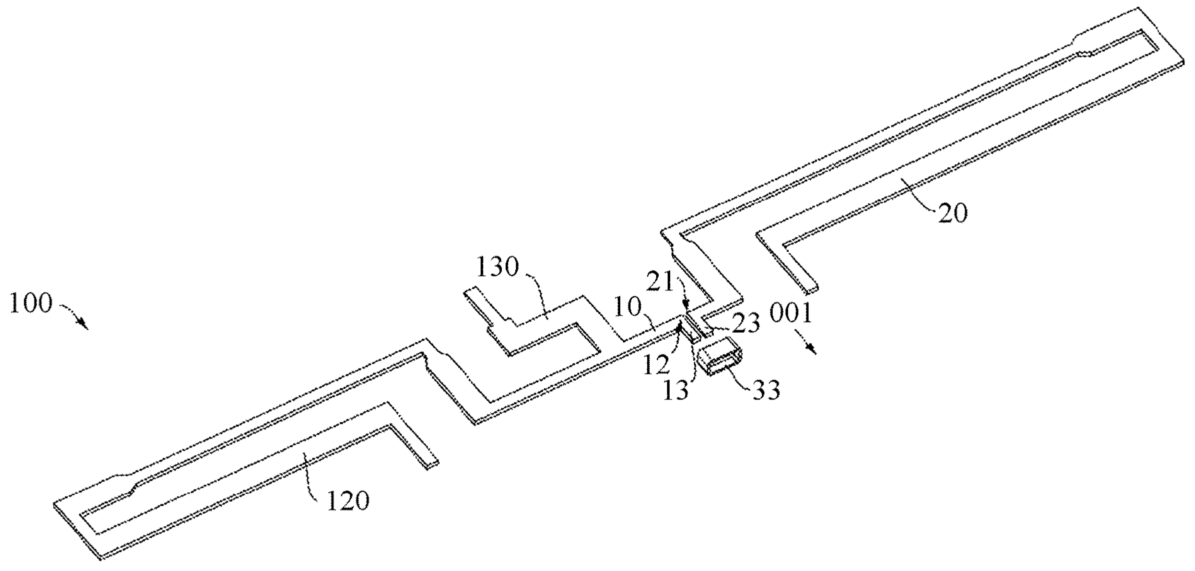
Figure 12A:
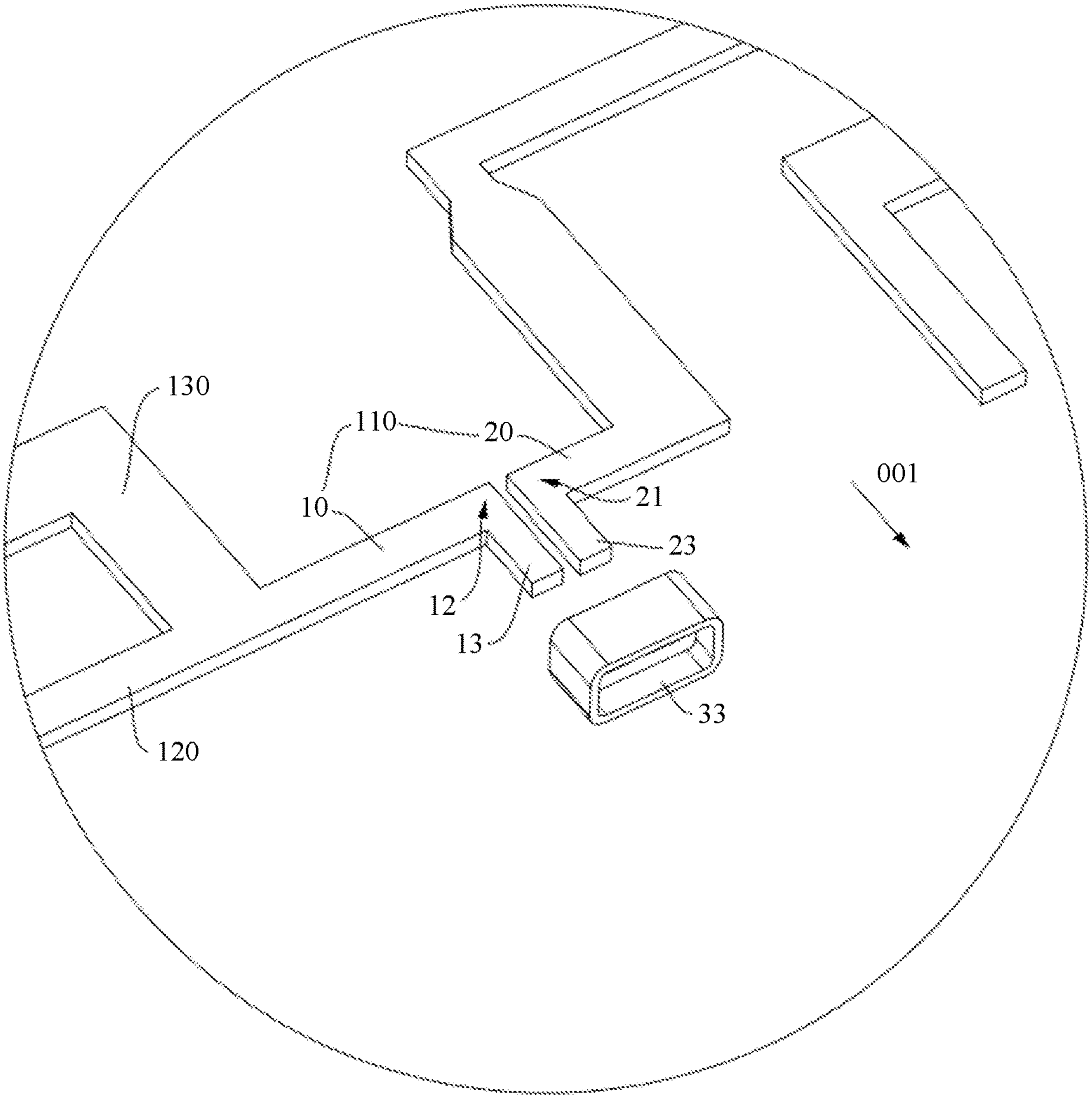
Figure 13:
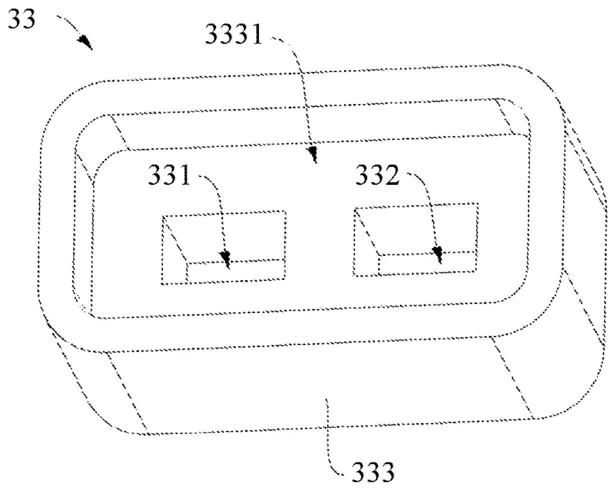
Figure 14:
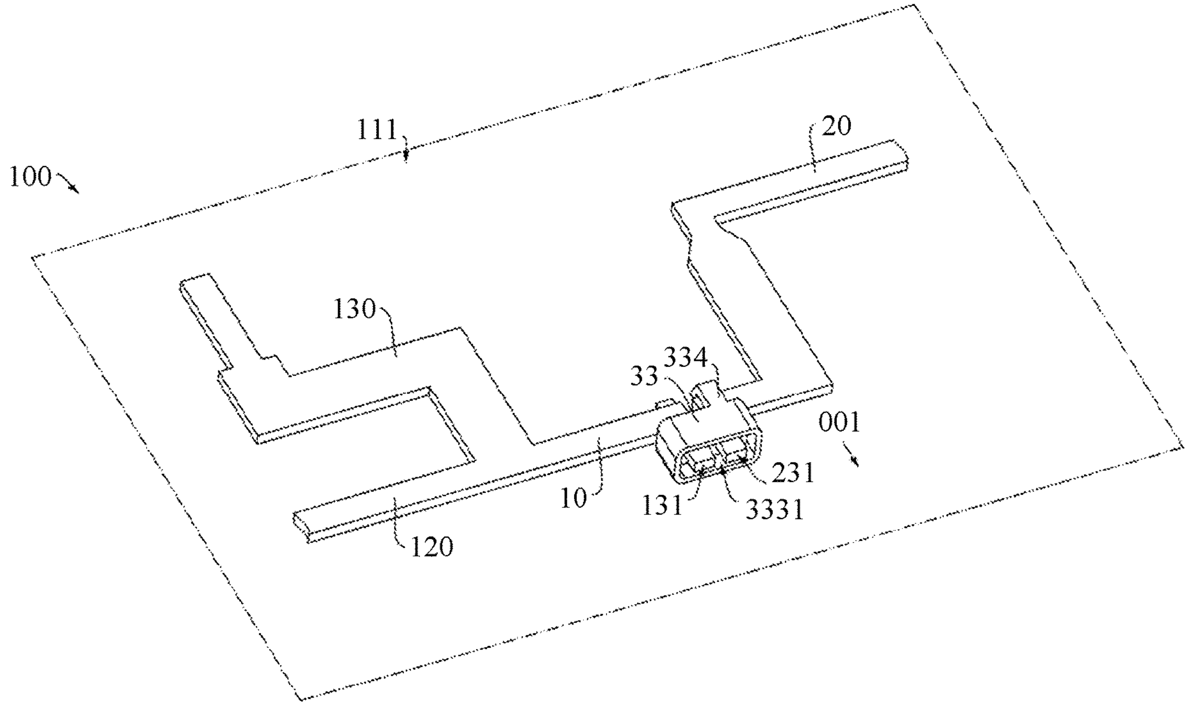
Figure 14A:
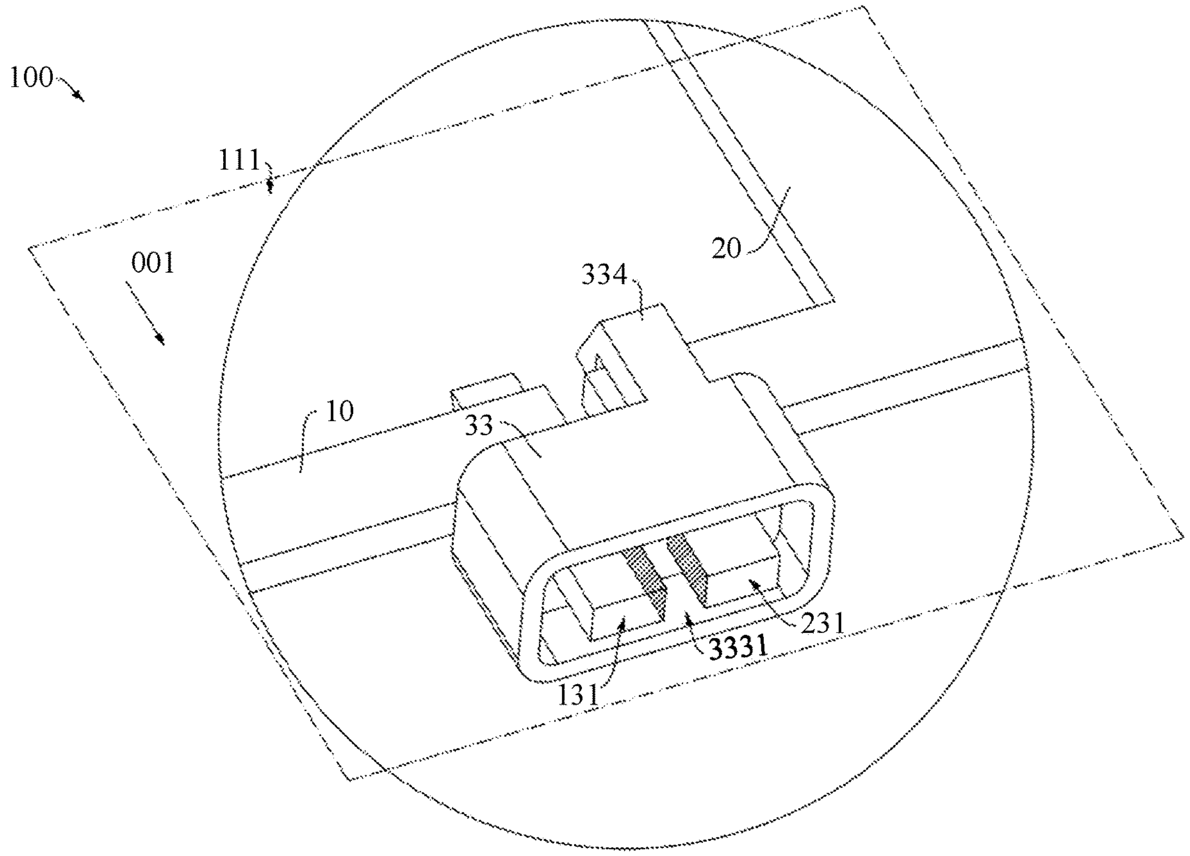
Figure 15:
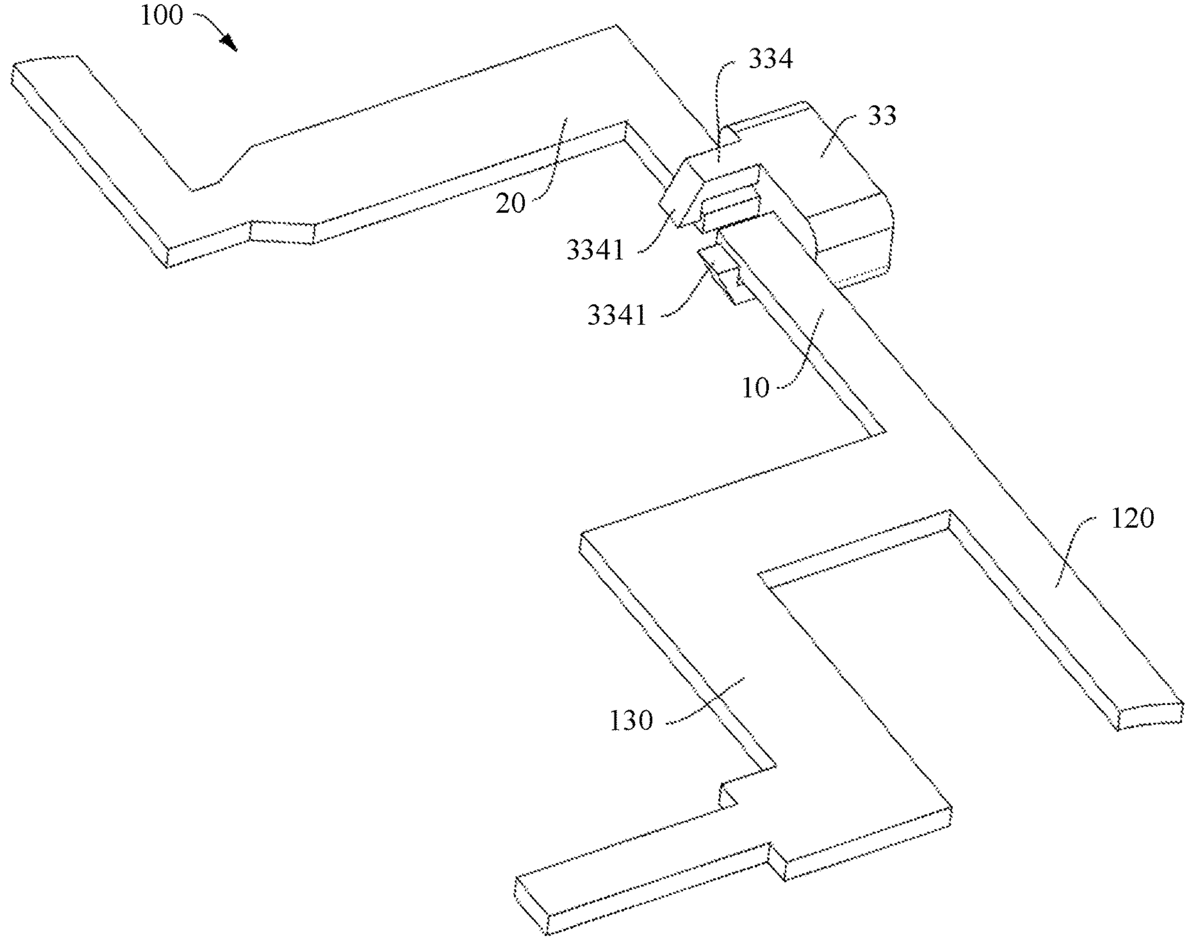
Figure 16:
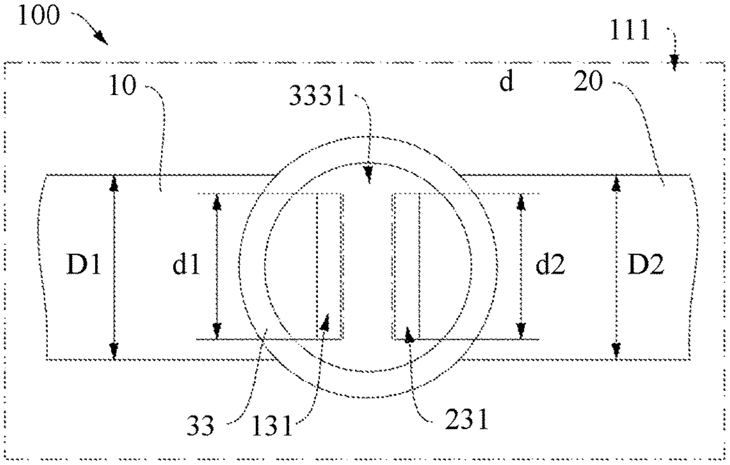
Figure 17:
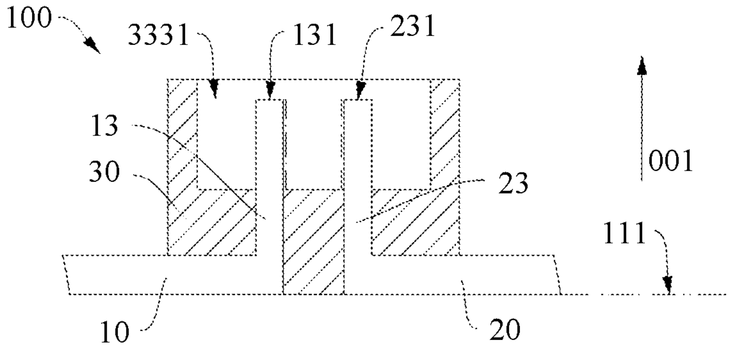

FIG. **4*a* is a schematic diagram of a partial position of a connector of a strip line in FIG. 4**;

FIG. 5 is a schematic diagram of a structure of a strip line in a suspended strip line according to an embodiment of this disclosure;

FIG. 6 is a schematic diagram of a partial structure of a strip line according to an embodiment of this disclosure;

FIG. **6*a* is a schematic diagram of a partial position of a connector of a strip line in FIG. 6**;

FIG. 7 is a schematic diagram of a structure of a connector in a strip line according to an embodiment of this disclosure;

FIG. 8 is a schematic diagram of a partial structure of another strip line according to an embodiment of this disclosure;

FIG. 9 is a schematic diagram of a structure of a suspended strip line according to an embodiment of this disclosure;

FIG. 10 is a schematic diagram of a structure of another suspended strip line according to an embodiment of this disclosure;

FIG. 11 is a schematic diagram of a structure of a strip line in another suspended strip line according to an embodiment of this disclosure;

FIG. 11*a* is a schematic diagram of a partial position of a connector of a strip line in FIG. 11;

FIG. 12 is a schematic diagram of a structure of a strip line in another suspended strip line according to an embodiment of this disclosure;

FIG. 12*a* is a schematic diagram of a partial position of a connector of a strip line in FIG. 12;

FIG. 13 is a schematic diagram of a structure of a connector in a strip line according to an embodiment of this disclosure;

FIG. 14 is a schematic diagram of a partial structure of a connector assembled in a strip line according to an embodiment of this disclosure;

FIG. 14*a* is a schematic diagram of a partial position of a connector of a strip line in FIG. 14;

FIG. 15 is a schematic diagram of a partial structure of another connector assembled in a strip line according to an embodiment of this disclosure;

FIG. 16 is a schematic diagram of a structure of a strip line in still another suspended strip line according to an embodiment of this disclosure; and FIG. 17 is a schematic diagram of a cross-section structure of a strip line in a suspended strip line according to an embodiment of this disclosure.

DESCRIPTION OF EMBODIMENTS

The following describes technical solutions in embodiments of this disclosure with reference to accompanying drawings in embodiments of this disclosure. It is clear that the described embodiments are merely some but not all of embodiments of this disclosure. All other embodiments obtained by a person of ordinary skill in the art based on embodiments of this disclosure without creative efforts shall fall within the protection scope of this disclosure.

Figure 1:
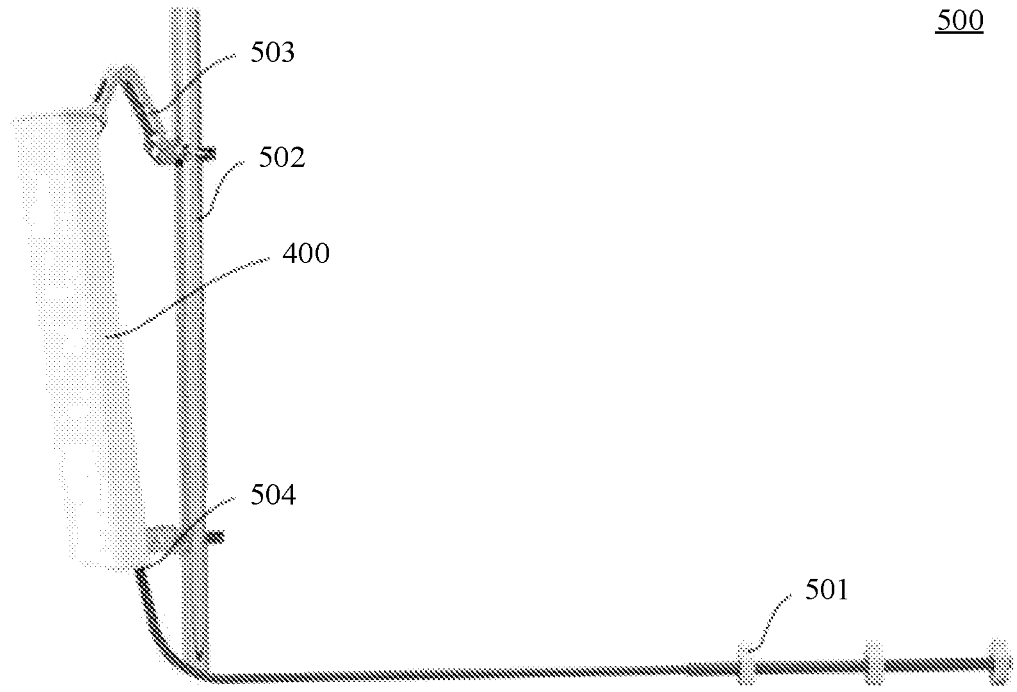
FIG. 1 is a schematic diagram of an antenna feeder system in a base station according to an embodiment of this disclosure.

The base station in this disclosure may include a baseband processing unit, a radio frequency processing unit, and an antenna feeder system 500 shown in FIG. 1. The radio frequency processing unit is connected between the baseband processing unit and the antenna feeder system 500. There may be a plurality of antenna feeder systems 500, and there may also be a plurality of radio frequency processing units of a same quantity. Each antenna feeder system 500 cooperates with one radio frequency processing unit, and the plurality of antenna feeder systems 500 are connected to one baseband processing unit by corresponding radio frequency processing units, to implement a function of receiving and transmitting a radio signal. In an implementation, the radio frequency processing unit may be integrated with an antenna. In another implementation, the radio frequency processing unit is independently disposed.

Refer to a schematic diagram of a structure of an antenna feeder system 500 shown in FIG. 1. The antenna feeder system 500 includes an antenna assembly 400, a pole 502, an antenna support 503, a connector seal 504, and a grounding apparatus 501. The pole 502 is fixed relative to a ground. The antenna support 503 is connected between the antenna assembly 400 and the pole 502, to implement a fixed connection between the antenna assembly 400 and the pole 502. In some embodiments, the antenna support 503 may further be configured as an adjustable support, which is configured to adjust an orientation and an angle of the antenna assembly 400 relative to the pole 502, to cooperate with a signal transmission angle of the antenna assembly 400, and ensure that a signal sent by the antenna feeder system 500 can form a preset downtilt angle with the ground. The antenna feeder system 500 in this disclosure may be disposed in any public place or cell, to implement a signal coverage function in a corresponding region of the antenna feeder system 500.

The antenna assembly 400 is further electrically connected to the grounding apparatus 501, to implement a grounding function of the antenna assembly 400. One end of the grounding apparatus 501 away from the antenna assembly 400 may further be connected to and fixed to the pole 502, and a grounding function is implemented through the pole 502. It may be understood that the grounding apparatus 501 may also be directly fixed on the ground, to ensure a reliable grounding function of the antenna assembly 400. The antenna assembly 400 is usually accommodated in a sealed box body (radome). The box body needs to have sufficient rigidity and strength and capabilities such as anti-fouling and waterproofing in mechanical performance, to protect an internal component of the antenna assembly 400 from being affected by an external environment. The box body needs to have a good electromagnetic wave penetration characteristic in electrical performance, to ensure a function of receiving and transmitting a signal by the antenna assembly 400. A connector seal 504 may also be disposed between the grounding apparatus 501 and the case of the antenna assembly 400. When the grounding apparatus 501 is led out of the antenna assembly 400, sealing connection between the grounding device 501 and the box body of the antenna assembly 400 can be implemented through the connector sealing member 504, thereby implementing sealing protection for each component inside the box body of the antenna assembly 400.

Figure 2:
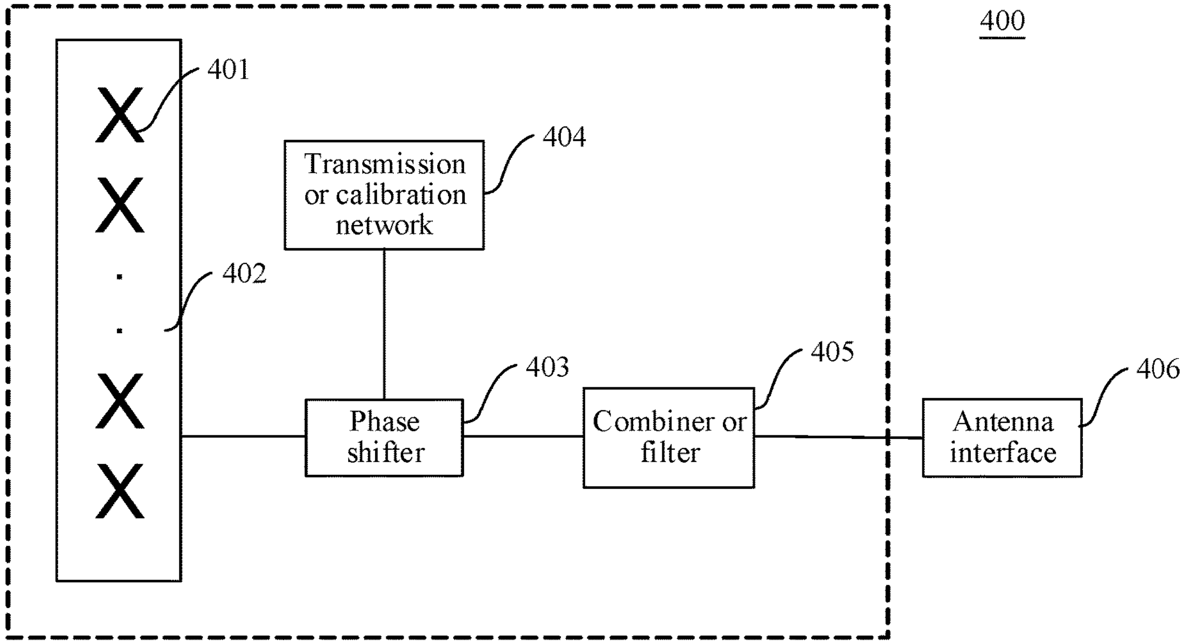
FIG. 2 is a schematic diagram of an internal architecture of an antenna assembly according to an embodiment of this disclosure.

Refer to an internal architectural diagram of an antenna assembly 400 in an antenna feeder system 500 according to this disclosure shown in FIG. 2. One or more radiation units 401, a metal reflection panel 402, and a phase shifter 403 are disposed inside the box body of the antenna assembly 400 in this disclosure. The radiation unit 401 is located on a side of the metal reflection panel 402, and forms at least one independent array with the metal reflection panel 402. The radiation unit 401 may include an antenna oscillator (also referred to as an oscillator), configured to transmit or receive a radio wave. Frequencies of the radiation units 401 in the independent array may be the same or may be different, to correspond to receiving and transmission of waves in different frequency bands. When the metal reflection panel 402 is located on one side of the radiation unit 402, the metal reflection panel 402 is configured to reflect a radio signal and aggregate the radio signal on the radiation unit 401, to enhance a radio signal received by the radiation unit 401. The metal reflection panel 402 is further configured to reflect the radio signal at the radiation unit 401 and transmit the radio signal outward, to enhance strength of a signal sent by the radiation unit 401. Further, the metal reflection panel 402 is further configured to block or shield a radio signal from the other side (to be specific, a reverse direction) of the radiation unit 401, to prevent the radio signal from the other side from interfering with the radiation unit 401.

The phase shifter 403 is electrically connected to the radiation unit 401. A side of the phase shifter 403 away from the radiation unit 401 is further connected to an antenna interface 406, and is connected to a baseband processing unit of the base station through the antenna interface 406. The baseband processing unit may be configured to generate a signal, and transfer the signal to the radiation unit 401 after phase allocation by the phase shifter 403 and transmit the signal outward; or the baseband processing unit is configured to receive the radio signal transmitted by the radiation unit 401, and the radio signal is obtained through processing by the phase shifter 403 based on a specific phase. The phase shifter 403 in this disclosure is configured to perform phase adjustment on a radio signal, to change a downtilt angle of a radio signal beam, thereby optimizing a communication network. Further, functional devices such as a transmission or calibration network 404 and a combiner or a filter 405 may further be disposed in the antenna assembly 400, and are separately configured to perform operations such as calibration of a radio signal and adjustment of an amplitude of the radio signal.

Figure 3:
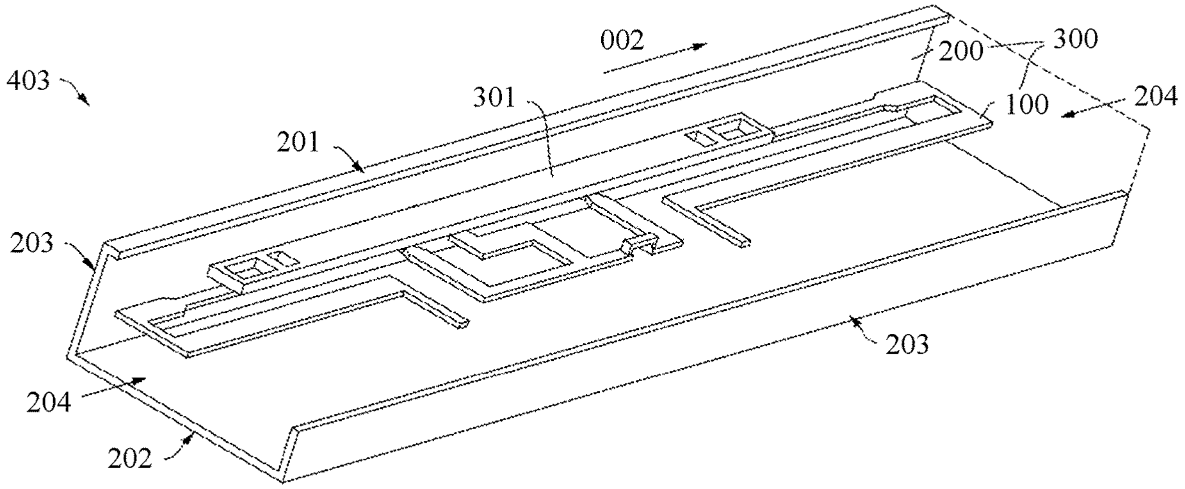
FIG. 3 is a schematic diagram of a structure of a phase shifter according to an embodiment of this disclosure.

Refer to a schematic diagram of an internal structure of a phase shifter 403 according to this disclosure shown in FIG. 3. The phase shifter 403 may include a suspended strip line 300 and a sliding medium 301. The sliding medium 301 may slide relative to the suspended strip line 300, to adjust a phase of an electrical signal in the phase shifter 403 by changing an electrical length of the suspended strip line 300, to be specific, a ratio of a physical length of a transmission line to a transmitted wavelength. In the phase shifter 403 in this disclosure, the suspended strip line 300 may be configured to implement a function of a power divider. To be specific, the sliding medium 301 slides relative to the power divider formed by the suspended strip line 300, to change phase output of the phase shifter 403. It may be understood that, in some other embodiments, the suspended strip line 300 provided in this disclosure may further be applied to another wireless communication device, for example, a product such as a coupler, a remote electrical tilt device, or a filter, to implement functions such as microwave radio signal transmission and/or phase adjustment. However, in the specification of this disclosure, for ease of description of the embodiments, the suspended strip line 300 is configured as a power divider in the phase shifter 403 to describe the implementations.

Still refer to FIG. 3, and synchronously refer to a schematic top view of an internal structure of a phase shifter 403 according to this disclosure shown in FIG. 4. The suspended strip line 300 includes a cavity 200 and the strip line 100 shown in FIG. 3. The strip line 100 is located in the cavity 200 and is fixed relative to the cavity 200. The strip line 100 is further insulated from the cavity 200. In an embodiment, the strip line 100 is integrally accommodated in the cavity 200. In addition, it can be seen from FIG. 4 that the strip line 100 mainly extends in the cavity 200 along a second direction 002. Alternatively, the second direction 002 may be defined as a main extension direction of the strip line 100.

The cavity 200 has electromagnetic shielding performance, and may be configured as a grounding structure of the strip line 100, and at the same time, forms shielding for external signal interference, to ensure transmission of an electrical signal of the strip line 100. In an embodiment, the cavity 200 may be an integrally sealed structure. The strip line 100 is accommodated in the integrally sealed cavity 200, thereby achieving a better shielding effect. In some other embodiments, a through hole 204 may be provided in the cavity 200 as shown in FIG. 3 and FIG. 4. Specifically, in the cavity 200 shown in FIG. 3 and FIG. 4, the cavity 200 has an upper surface 201 and a lower surface 202 that are disposed opposite to each other, and a side surface 203 connected between the upper surface 201 and the lower surface 202. Two side surfaces 203 are provided, and the two side surfaces 203 are also disposed separately on two opposite sides of the strip line 100. The upper surface 201, the lower surface 202, and the two side surfaces 203 all extend along the second direction 002. In a length extension direction (the second direction 002) of the strip line 100, the cavity 200 is a structure in which the through holes 204 are provided at two ends. To be specific, the cavity 200 forms a through structure in a direction along the length extension direction (the second direction 002) of the strip line 100, and the through hole 204 penetrates the cavity 200 along the second direction 002. The cavities 200 with the two structures can both form a reliable shielding function for the strip line 100, and the cavity 200 provided with the through hole 204 is further convenient to be manufactured by a molding process such as extrusion and casting, and is also convenient to assemble the strip line 100 in the cavity 200.

The sliding medium 301 is slidably connected in the cavity 200, and is located on one side of the strip line 100. In the schematic diagrams of FIG. 3 and FIG. 4, the sliding medium 301 is located above the strip line 100 in a vertical direction. The sliding medium 301 may slide relative to the cavity 200, and adjust a relative position of the sliding medium 301 and the strip line 100. A different relative position of the sliding medium 301 and the strip line 100 is different, causing an equivalent dielectric constant of the strip line 100 to change correspondingly. To be specific, sliding of the sliding medium 301 relative to the strip line 100 may change an electrical length of the strip line 100, thereby changing phase output of the strip line 100. In an embodiment, the sliding medium 301 slides along an extension direction (the second direction 002) of the strip line 100 relative to the strip line 100, to form a larger range of phase shift effect on the strip line 100.

Still refer to FIG. 4. The strip line 100 includes a signal processing line 130 and at least two power branch lines. In the schematic diagram of FIG. 4, the at least two power branch lines include a first power branch line 110 and a second power branch line 120. The strip line 100 further includes a signal processing port 101 and a signal transceiver port 102. A plurality of signal transceiver ports 102 are also provided, and each power branch line is connected to one signal transceiver port 102. In the schematic diagram of FIG. 4, the first power branch line 110 is connected to a first signal transceiver port 1021, and the second power branch line 120 is connected to a second signal transceiver port 1022.

One end of the signal processing line 130 is connected to the signal processing port 101. The signal processing line 130 receives a signal to a baseband processing unit through the signal processing port 101, or transmits a signal output by a baseband processing unit. In this case, the baseband processing unit may be understood as a signal source. In this embodiment of this disclosure, the signal processing port 101 and the signal transceiver port 102 may be independent interface structures. The signal processing port 101 may alternatively be defined as one end of the signal processing line 130, and the signal transceiver port 102 may alternatively be defined as one end of the power branch line. It may be understood that, a notch (not shown in the figure) corresponding to a position of the signal processing port 101 and a position of the signal transceiver port 102 may further be provided on the cavity 200, to implement signal transmission between the suspended strip line and the outside.

One end of the signal processing line 130 away from the signal processing port 101 is separately conducted to the plurality of power branch lines. In the schematic diagram of FIG. 4, one end of the signal processing line 130 away from the signal processing port 101 is separately conducted to the first power branch line 110 and the second power branch line 120. It may be understood that, when the strip line 100 includes at least two power branch lines, all the at least two power branch lines need to be conducted to the signal processing line 130. In a position at which the signal processing line 130 is separately conducted to the first power branch line 110 and the second power branch line 120, a signal sent by the signal processing line 130 may be separately transmitted to the first power branch line 110 and the second power branch line 120, and a signal received by the signal processing line 130 may also be separately obtained by the first power branch line 110 and the second power branch line 120. A position in which the signal processing line 130 is connected to the first power branch line 110 and the second power branch line 120 is a power divider node.

Because lengths of the first power branch line 110 and the second power branch line 120 are different, impedances of the first power branch line 110 and the second power branch line 120 are also different. After an electrical signal is sent from the signal processing port 101 to the suspended strip line 300 in this disclosure, the electrical signal is first transmitted to the power divider node by the signal processing line 130. Then, the electrical signal is transmitted to the first signal transceiver port 1021 and the second signal transceiver port 1022 respectively through the first power branch line 110 and the second power branch line 120. In addition, due to a difference between the equivalent dielectric constants of the first power branch line 110 and the second power branch line 120, a phase difference of the electrical signals is formed at the first signal transceiver port 1021 and the second signal transceiver port 1022, and therefore, output phase allocation of the electrical signals is adjusted.

For the phase shifter 300 in this disclosure, the sliding medium 301 further covers both the first power branch line 110 and the second power branch line 120. As mentioned above, both the first power branch line 110 and the second power branch line 120 mainly extend along the second direction 002. Therefore, the sliding medium 301 may cover both the first power branch line 110 and the second power branch line 120 along the second direction 002. In this case, relative to sliding of the cavity 200, a length of the sliding medium 301 corresponding to covering the first power branch line 110, and a length corresponding to covering the second power branch line 120 also change synchronously. An equivalent dielectric constant of a part of the first power branch line 110 covered by the sliding medium 301 changes, and an equivalent dielectric constant of a part of the second power branch line 120 covered by the sliding medium 301 also changes. Therefore, when the sliding medium 301 slides relative to the cavity 200, areas of the first power branch line 110 and the second power branch line 120 covered by the sliding medium 301 change synchronously. To be specific, the equivalent dielectric constants of the first power branch line 110 and the second power branch line 120 change synchronously under a sliding effect of the sliding medium 301. Therefore, an electrical length from the power divider node to the first signal transceiver port 1021 and an electrical length from the power divider node to the second signal transceiver port 1022 are also correspondingly adjusted. In this disclosure, the phase shifter 400 may change a phase angle difference between the first transceiver port 1021 and the second transceiver port 1022 by sliding the sliding medium 301, to achieve a function of adjusting a phase of an electrical signal.

It may be understood that, when the electrical signals are input from the first transceiver port 1021 and the second transceiver port 1022 and transmitted to the signal processing port 101, the electrical signal obtained by the signal processing port 101 also undergoes phase adjustment due to a difference between electrical lengths of the first power branch line 110 and the second power branch line 120.

When a plurality of power branch lines of the strip line 100 are provided, the sliding medium may alternatively cover the plurality of power branch lines at the same time, and slide synchronously relative to the plurality of power branch lines, to synchronously change electrical lengths of the plurality of power branch lines, thereby implementing a phase allocation function from more angles.

In an existing suspended strip line structure, based on a requirement for implementing a phase adjustment function, a transmission line with a relatively long extension path usually needs to be prepared. As a result, lengths of some transmission lines even exceed 1000 millimeters (mm). However, a line width of an existing transmission line is usually maintained between 2 mm and 3 mm. As a result, a length-width ratio of the existing transmission line is relatively large, fabrication of the existing transmission line is more difficult, and maintaining consistency of line widths of extension paths is difficult. The consistency of line widths indicates a shape difference between cross sections of any two transmission lines in an extension direction of the transmission line. A smaller shape difference between the two cross sections indicates higher consistency of line widths of the transmission line. It may be understood that a shorter extension path of the transmission line indicates more conducive to control consistency of line widths of the transmission line. However, due to a relatively large length of the existing transmission line, consistency of line widths of the existing transmission line is poor, causing an equivalent dielectric constant of the existing transmission line to change. As a result, an electrical signal transmitted on the existing transmission line has an undesirable phenomenon such as mismatch and reflection loss, and it is relatively difficult to adjust a phase deviation of the electrical signal. Further, a relatively long transmission line further causes an excessively large size of an existing suspended strip line. This is not conducive to transportation and mounting of the existing suspended strip line.

It should be noted that, in this embodiment of this specification, the suspended strip line 300 is used as a power divider in the phase shifter 403. Therefore, a transmission line in the strip line 300 is defined as a power branch line, and is also referred to as a power branch line. In this disclosure, when the suspended strip line 300 is used as a component in a coupler, the transmission line may be defined as a coupling line; or when the suspended strip line 300 is used as a filter, the transmission line may be defined as a filter line or a filter stub. Based on different specific functions, names of transmission lines in the suspended strip line 300 in this disclosure may be slightly different.

Figure 4A:
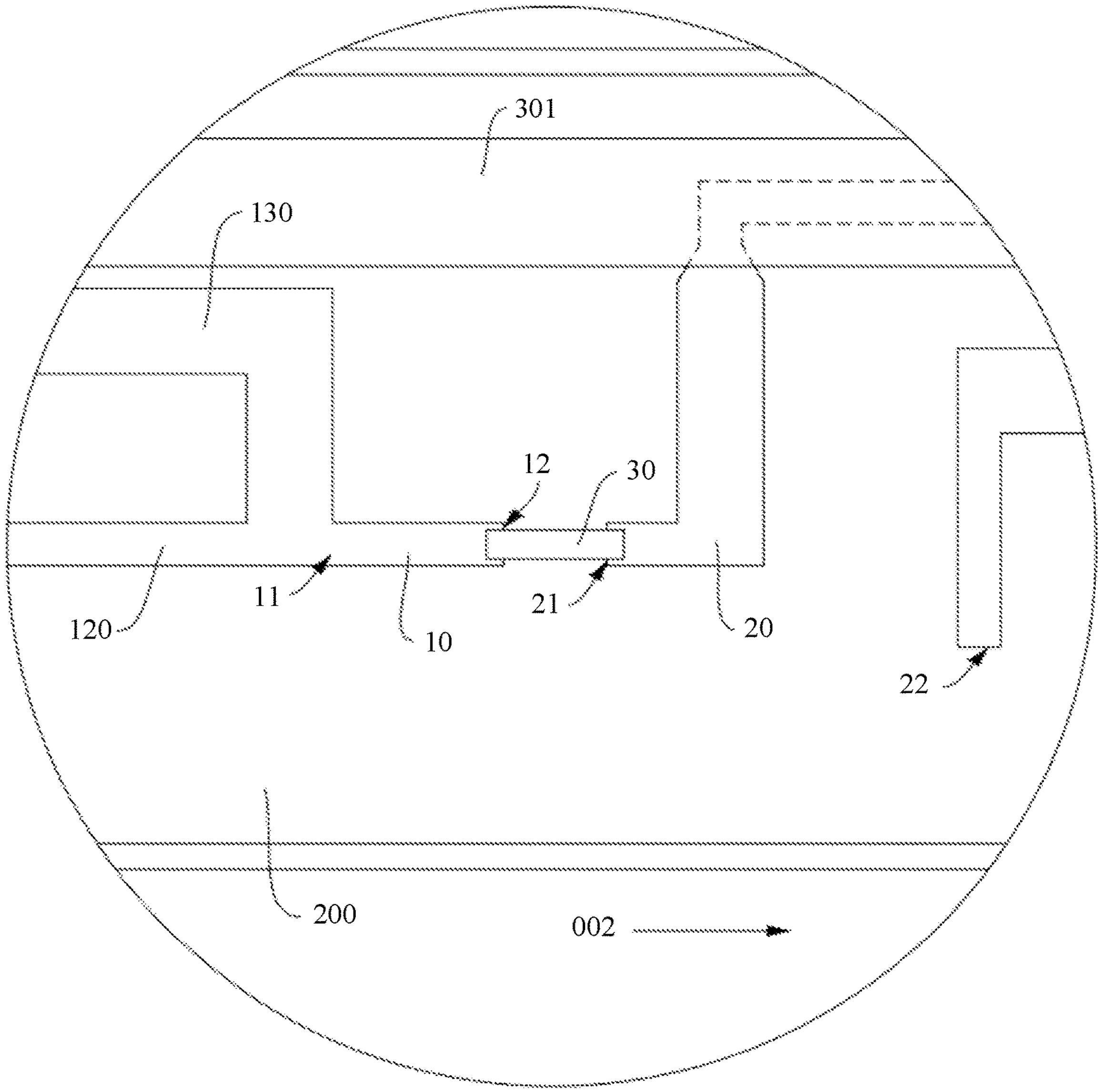

Refer to a schematic diagram of a partial structure of a strip line 100 in a phase shifter 403 shown in FIG. 4*a*, and refer to a specific structure of a suspended strip line 300 shown in FIG. 5. In the suspended strip line 300 in this disclosure, the first power branch line 110 in a plurality of power branch lines is disconnected into a first segment 10 and a second segment 20 along an extension direction of the first power branch line 110. The first segment 10 is located on one side close to the power divider node, and the second segment 20 is located on one side close to the first signal transceiver end 1021. To be specific, the first segment 10 includes a first end 11 and a second end 12 that are opposite to each other. The first end 11 is connected to the signal processing line 130. The second end 12 is located, along an extension direction of the first power branch line 110, at a position away from the signal processing line 130. The second end 12 is close to the second segment 20. The second segment 20 also includes a third end 21 and a fourth end 22 that are opposite to each other. The fourth end 22 is located at a position of the first signal transceiver port 1021. The third end 21 is located at a position close to the first segment 10. The third end 21 is also close to the second end 12. The first segment 10 and the second segment 20 in the first power branch line 110 are disconnected from each other.

The strip line 100 further includes a connector 30. The connector 30 is located between the first segment 10 and the second segment 20. The connector 30 is further fixed separately relative to the first segment 10 and the second segment 20, and is configured to implement a signal transmission function between the first segment 10 and the second segment 20. Specifically, refer to FIG. 4, FIG. 4*a*, and FIG. 5. The first power branch line 110 is disconnected into the first segment 10 and the second segment 20 that are spaced apart from each other. For example, an electrical signal is input from the signal processing port 101, and after being transmitted on the first power branch line 110 to the second end 12, a signal at the second end 12 is transmitted to the third end 21 by the connector 30 that is fixed separately relative to the first segment 10 and the second segment 20. In addition, the signal is further transmitted to the first signal transceiver port 1021 by the second segment 20, thereby implementing a function of transmitting the electrical signal on the entire first power branch line 110.

According to the suspended strip line 300 in this disclosure, the first power branch line 110 corresponding to the existing transmission line is disconnected into the first segment 10 and the second segment 20 that are independent of each other, and the connector 30 implements signal transmission between the first segment 10 and the second segment 20, so that the first segment 10 and the second segment 20 can be separately fabricated, and their respective length-width ratios are controlled, to improve consistency of the first segment 10 and the second segment 20, and further ensure overall consistency of the first power branch line 110. In addition, the first segment 10 and the second segment 20 may further be transported in a separated form. During mounting, a suspended strip line with a relatively large size does not need to be operated. Instead, after the disconnected first segment 10 and the disconnected second segment 20 are spliced and assembled, a signal transmission function between the first segment 10 and the second segment 20 is implemented by the connector 30, to form the first power branch line 110. Such arrangement also reduces transportation and mounting costs of the suspended strip line 300. It may be understood that, both the phase shifter 403 in this disclosure and the base station related in this disclosure are configured with the suspended strip line 300 in this disclosure, thereby achieving better consistency of signal transmission and reducing transportation and mounting costs. However, when the suspended strip line 300 in this disclosure is used as a coupler, a remote electrical tilt device, or a filter, the coupler, the remote electrical tilt device, and the filter that are equipped with the suspended strip line 300 in this disclosure correspondingly have a better signal transmission capability and lower transportation and mounting costs.

It may be understood that, for the plurality of power branch lines in the strip line 100, a specific quantity of power branch lines that are disconnected from each other is not limited in this disclosure. To be specific, based on a specific length and a working requirement of each power branch line in the strip line 100, there may be a plurality of lines that are disconnected into two opposite segments in the plurality of power branch lines. Even all the plurality of power branch lines are disposed to be disconnected into lines in a form of two opposite segments. A signal transmission function between the disconnected lines is implemented by a connector 30 corresponding to the plurality of power branch lines. In this disclosure, only an embodiment in which one of the plurality of power branch lines is a disconnected structure is shown.

The first power branch line 110 may further be divided into three segments that are disconnected from each other. To be specific, the first power branch line 110 is disconnected into a first segment 10, a second segment 20, and a third segment (not shown in the figure). The third segment and the second segment 20 are also disconnected from each other. The third segment is located at one end of the second segment 20 away from the first segment 10. In this case, the third segment includes one end close to the second segment 20 and one end away from the second segment 20. The one end of the third segment away from the second segment 20 is connected to the first signal transceiver port 1021. A signal transmission function between the second segment 20 and the third segment may alternatively be implemented by the connector 30. Further, the first power branch line 110 is divided into more segments that are disconnected from each other, and may be specifically set based on a length of the first power branch line 110 and an actual requirement of a working condition. Because of the signal transmission function of the connector 30 in this disclosure, the suspended strip line 300 in this disclosure may arbitrarily set a quantity of the disconnected power branch lines and a quantity of each power branch line disconnected into a plurality of segments. This can ensure implementation of the function of the suspended strip line 300 in this disclosure.

Refer to an implementation of a connector 30 shown in FIG. 6. In the schematic diagram of FIG. 6, it is assumed that the first power branch line 110 (represented as a first segment 10 and a second segment 20 in FIG. 6) is located on a first plane 111. In this case, both the first segment 10 and the second segment 20 are located on the first plane 111 and extend on the first plane 111. To be specific, the second direction 002 is located in the first plane 111. In this case, the signal processing line 130 and the remaining power branch lines are also located in the first plane 111. In this embodiment, the connector 30 is constructed in a form of a bridged jumper 31. The jumper 31 is conductive, and includes a connection segment 313, a first pin 311, and a second pin 312. The first pin 311 and the second pin 312 are separately disposed at two ends of the connection segment 313. To be specific, the connection segment 313 is connected between the first pin 311 and the second pin 312. A length direction of the connection segment 313 is disposed along an extension direction of the first power branch line 110, the first pin 311 is located on one side close to the first segment 10, and the second pin 312 is located on one side close to the second segment 20. The connection segment 313 is located outside the first plane 111, and is spaced from the first power branch line 110. The connection segment 313 is fixedly connected to and conducted to the first segment 10 through the first pin 311. The connection segment 313 is further fixedly connected to and conducted to the second segment 20 through the second pin 312. It may be understood that the first pin 311 may be relatively fixed to and conducted to the first segment 10 through welding, and the second pin 312 may also be relatively fixed to and conducted to the second segment 20 through welding.

In this way, after an electrical signal input from the first end 11 of the first segment 10 reaches the second end 12, the electrical signal may be transmitted to the connection segment 313 through the first pin 311, and then is continuously transmitted to the second pin 312 through the connection segment 313, and then transmitted from the second pin 312 to the third end 21 of the second segment 20, so that the electrical signal can be continuously transmitted to the fourth end 22 along the second end 20, and finally output from the first signal transceiver port 1021. On the contrary, when an electrical signal is input from the first signal transceiver port 1021, the electrical signal may be sequentially transmitted to the second pin 312, the connection segment 313, the first pin 311, and the first segment 10 through the second segment 20, and finally the signal is transmitted to the signal processing line 130 through the power divider node. The bridged jumper 31 is connected to and conducted to the first segment 10 and the second segment 20 separately, so that the electrical signal can be transmitted between the first segment 10 and the second segment 20.

It may be understood that, in the embodiment in FIG. 6, a connection position between the first pin 311 and the first segment 10 may be located near a position of the second end 12. In addition to conduction through welding, the first pin 311 and the first segment 10 may further be lapped through a buckle, adhesion, or the like. A conduction effect between the first pin 311 and the first segment 10 can be ensured provided that reliable contact between the first pin 311 and the first segment 10 is ensured. Correspondingly, a connection position between the second pin 312 and the second segment 20 may also be located near the third end 21, and the second pin 312 and the second segment 20 may also be lapped through a buckle, adhesion, or the like, to implement a signal transmission function of the connector 30.

In an embodiment, refer to FIG. *6a*. A line width d of the connection segment 313 may further be set to be less than or equal to a line width D1 of the first segment 10 and less than or equal to a line width D2 of the second segment 10. As mentioned above, in the suspended strip line 300 in this disclosure, to meet a requirement that equivalent dielectric constants of the strip lines 100 are consistent, on a path extending along the first power branch line 110, line width sizes of the first power branch line 110 perpendicular to the extension path tend to be consistent. To be specific, the line width D1 of the first segment 10 and the line width D2 of the second segment 20 is preferably set to be equal. However, when the jumper 31 is connected between the first segment 10 and the second segment 20, a structural characteristic of the jumper 31 enables an equivalent dielectric constant of the jumper 31 to be slightly greater than an equivalent dielectric constant of the first segment 10 and an equivalent dielectric constant of the second segment 20. Therefore, a line width d of the connection segment 313 of the jumper 31 is set to be less than or equal to the line width D1 of the first segment 10 and the line width D2 of the second segment 20. This helps control impedance matching between the jumper 31 and the first segment 10 and the second segment 20, thereby reducing a loss at the jumper 31, and improving overall electrical performance of the first power branch line 110.

Refer to another embodiment of the jumper 31 shown in FIG. 7. In the schematic diagram of FIG. 7, a curve segment 3131 is further disposed in the connection segment 313 of the jumper 31. The curve segment 3131 bends along an extension path from the first pin 311 to the second pin 312. This enables an overall length of the connection segment of the jumper is greater than a linear distance between the first pin 311 and the second pin 312. When the jumper 31 is bridged between the first segment 10 and the second segment 20, if the jumper 31 is fixed through welding, thermal stress is formed on the jumper 31, and the jumper 31 may deform accordingly. In this case, because the curve segment 3131 is disposed on the connection segment 313, the jumper 31 may compensate, by deformation of the curve segment 3131, for a deformation phenomenon caused by thermal stress, to ensure that the connection segment 313 maintains a sufficient length between the first pin 311 and the second pin 312, and avoid a defect that the connection segment 313 may generate a crack or even be broken due to deformation caused by thermal stress.

FIG. 8 shows another implementation of a connector 30. In this implementation, the connector 30 is constructed in a form of a patch 32 that implements signal transmission by coupling. Specifically, the patch 32 includes a first coupling end 321 and a second coupling end 322, and a connecting plate 323 connected between the first coupling end 321 and the second coupling end 322. The patch 32 is spaced apart from the first segment 10 and the second segment 20, and an isolation pad 324 is sandwiched between the patch 32 and the first power branch line 110 (represented as the first segment 10 and the second segment 20 in FIG. 8). The isolation pad 324 is an insulating material and may be formed by injection molding. The isolation pad 324 is configured to implement insulation and fixing between the patch 32 and the first power branch line 110, so that the patch 32 is separately coupled to the first segment 10 and the second segment 20 to transmit signals.

Specifically, two isolation pads 324 are provided, and the two isolation pads 324 are respectively located between the first coupling end 321 and the first segment 10, and between the second coupling segment 322 and the second segment 20. The first coupling end 321 and the second end 12 of the first segment 10 are spaced apart from each other. The isolation pad 324 is configured to fix and support the first coupling end 321. The first power branch line 110 is also located in the first plane 111. In this case, the two isolation pads 324 are respectively located at the second end 12 and the third end 21. The first coupling end 321 is fixedly connected to the isolation pad 324 located at the second end 12. A projection of the first coupling end 321 on the first plane 111 at least partially overlaps with the second end 12. Therefore, the second end 12 and the first coupling end 321 may form capacitance, and transmit the electrical signal on the first segment 10 to the first coupling end 321 by coupling.

The first coupling end 321 transmits the electrical signal to the second coupling end 322 through the connecting plate 323. Similarly, an isolation pad 324 is also disposed between the second coupling end 322 and the third end 21, and a projection of the second coupling end 322 on the first plane 111 also at least partially overlaps with the third segment 21. Therefore, the second coupling end 322 may transmit the electrical signal to the third end 21 by coupling, and further transmit the electrical signal through the second segment 20.

It may be understood that, when an electrical signal is input from the second segment 20, a function of transmitting the electrical signal from the second segment 20 to the first segment 10 through the patch 32 may also be implemented by coupling twice.

It may be understood that, an implementation of the patch 32 is similar to an implementation of the jumper 31, and details of some embodiments of the jumper 31 may also be applied to the patch 32, to improve a signal transmission effect of the connector 30. To be specific, a line width (not shown in the figure) of the connecting plate 323 may be less than or equal to the line width D1 of the first segment 10 and the line width D2 of the second segment 20. A curved part may be disposed on the connecting plate 323, to compensate for thermal stress deformation that may be formed when the patch 32 is hot-connected to the isolation pad 324 through injection molding or the like.

The strip line 100 in the foregoing embodiment is expanded based on a structure of a sheet metal strip line. In some other embodiments, the strip line may alternatively be a PCB (printed circuit board, PCB) strip line manufactured on a printed circuit board substrate, or in a strip line form in another manner.

Refer to another implementation shown in FIG. 9 and FIG. 10. FIG. 9 is a schematic diagram of an internal structure in a PCB strip line form. FIG. 10 is a top view of an internal structure in a PCB strip line form. The suspended strip line 300 further includes a first substrate 310 and a second substrate 320. Both the first substrate 310 and the second substrate 320 are fixed in the cavity 200, and the first substrate 310 and the second substrate 320 are relatively fixed. The first substrate 310 and the second substrate 320 are disposed side by side along the second direction 002. Both the first substrate 310 and the second substrate 320 are substrates of a printed circuit board (printed circuit board, PCB). The signal processing line 130, the second power branch line 120, and the first segment 10 are all located on the first substrate 310. The second segment 320 is located on the second substrate 320. The connector 30 is located between the first substrate 310 and the second substrate 320. Therefore, the strip line 100 is constructed as a PCB strip line.

In this implementation, the first substrate 310 includes a first outer surface 3101. The signal processing line 130, the second power branch line 120, and the first segment 10 are all located on the first outer surface 3101. Because the strip line 100 is constructed as a PCB strip line, the signal processing line 130, the second power branch line 120, and the first segment 10 may all be printed on the first outer surface 3101. Bottoms of the lines are separately in contact with and aligned with the first outer surface 3101. It may be understood that the second substrate 320 includes a second outer surface 3201, and the second outer surface 3201 and the first outer surface 3101 face a same direction. When the second segment 20 is located on the second substrate 320, the second segment 20 may also be printed on the second outer surface 3201, and a bottom surface of the second segment 20 is also flush with the second outer surface 3201.

In some other embodiments, a groove (not shown in the figure) may be correspondingly provided on the first substrate 310 and the second substrate 320. The groove is configured to accommodate each line of the strip line 100, and at least a part of each line of the strip line 100 is accommodated in the groove. In this case, the bottom surface of the strip line 100 is lower than the first outer surface 3101 and the second outer surface 3201. In some embodiments, when the strip line 100 is completely accommodated in the groove, a top surface of the strip line 100 may further be flush with the first outer surface 3101 and the second outer surface 3201. These embodiments are all possible implementations of the PCB strip line, and also fall within an implementation in which the strip line 100 in this disclosure is located on the first substrate 310 and the second substrate 320.

The first substrate 310 and the second substrate 320 may form reliable support for the strip line 100. The strip line 100 may also be fixed at a position relative to the cavity 200 by respectively fixing the first substrate 310 and the second substrate 320 relative to the cavity 200. However, after the first segment 10 of the first power branch line 110 is disposed on the first substrate 310 and the second segment 20 is disposed on the second substrate 320, the first power branch line 110 is disposed on two mutually independent substrates. A signal transmission function may also be implemented between the second end 12 of the first segment 10 and the third end 21 of the second segment 20 through the structure of the foregoing connector 30.

Specifically, in the schematic diagram of FIG. 9, the connector 30 is configured as a jumper 31. The jumper 31 is separately conducted to the first segment 10 and the second segment 20 through welding, to achieve an objective of signal transmission. In the schematic diagram of FIG. 10, the connector 30 is configured as a patch 32. The patch 32 transmits a signal to the first segment 10 and the second segment 20 separately through coupling, so as to transmit a signal through the first power branch line 110.

The second power branch line 120 and the signal processing line 130 are both located on the first substrate 310, to enable electrical conduction between the signal processing line 130 and the first segment 10 and between the signal processing line 130 and the second power branch line 120 to be implemented. In this embodiment, the first segment 10 and the second segment 20 are respectively located on the first substrate 310 and the second substrate 320. This enables the first substrate 310 and the second substrate 320 to be manufactured separately as relatively independent printed circuit boards. The first power branch line 110 may be connected and transmit a signal through a function of the connector 30 by the first segment 10 and the second segment 20 that are separated. A process of separately manufacturing the first substrate 310 and the second substrate 320 is relatively simplified. Compared with manufacturing a relatively long substrate of an existing suspended strip line to obtain a complete structure of the first power branch line, the strip line 100 in this disclosure can ensure higher consistency, and it is convenient for separate transportation of the first substrate 310 and the second substrate 320. In addition, a complete strip line 100 structure can also be obtained by splicing during mounting. To be specific, the suspended strip line 300 in this disclosure in a form of a PCB board strip line also improves consistency, and reduces costs.

It may be understood that, in the schematic diagrams of FIG. 9 and FIG. 10, only some possible embodiments of the suspended strip line 300 in this disclosure are provided. In an actual suspended strip line product, the first substrate 310 or the second substrate 320 may further be divided based on an actual structure of the strip line 100, to enable the suspended strip line 300 in this disclosure to be formed through several mutually spliced substrates. In this case, power branch lines disconnected into two segments due to division of the first substrate 310 or the second substrate 320 are also electrically connected through a plurality of connectors 30. To be specific, the plurality of connectors 30 are connected between any two adjacent substrates, and configured to implement overall conduction of the strip line 100. In another aspect, in addition to the first power branch line 110, other power branch lines including the second power branch line 120 may also be disposed on the substrates that are spliced with each other, and are conducted through the connector 30. This also falls within an implementation of the suspended strip line 300 claimed in this disclosure.

Refer to a schematic diagram of a structure of another side of a PCB strip line shown in FIG. 11. For the suspended strip line 300 of the PCB strip line structure, the first substrate 310 further includes a third outer surface 3102 opposite to the first outer surface 3101, and the second substrate 320 further includes a fourth outer surface 3202 opposite to the second outer surface 3201. It may be understood that the third outer surface 3102 and the fourth outer surface 3202 also face a same direction. On the third outer surface 3102 of the first substrate 310 and the fourth outer surface 3202 of the second substrate 320, a first line 140 configured to transmit a signal may also be disposed. The first line 140 may be another power branch line different from the first power branch line 110 and the second power branch line 120, or the first line 140 may be an auxiliary line of the first power branch line 110, extend synchronously with the first power branch line 110, and be conducted with the first power branch line 110 through a via (not shown in the figure).

Refer to FIG. 11*a*. The first line 140 also includes two parts that are disconnected from each other. The first part 141 is located on the first substrate 310, the second part 142 is located on the second substrate 320, and a connector 30 for implementing signal transmission is also disposed between the first part 141 and the second part 142. The connector 30 may also implement a signal transmission function on the line 140 in a form of the foregoing jumper 31 or patch 32.

In this case, in the suspended strip line 300 with the PCB strip line structure, lines for signal transmission, to be specific, the first power branch line 110 and the first line 140, are respectively disposed on two opposite surfaces of the first substrate 310 and two opposite surfaces of the second substrate 320. In addition, the first power branch line 110 includes two parts that are respectively located on the first substrate 310 and the second substrate 320, and the first line 140 also includes two parts that are respectively located on the first substrate 310 and the second substrate 320. The connector 30 may be separately disposed on two opposite sides of the first substrate 310 and the second substrate 320, to separately implement signal transmission between two opposite parts of the first power branch line 110 and a function of signal transmission between two opposite parts of the first line 140.

Another strip line structure in this disclosure is further described herein. Refer to FIG. 12. The first segment 10 includes a first extension segment 13, and the first extension segment 13 is located at one end of the first segment 10 away from the signal processing line 130. A material of the first extension segment 13 is the same as a material of the first segment 10, and the first extension segment 13 and the first segment 10 may be prepared and obtained synchronously. The second segment 20 includes a second extension segment 23, and the second extension segment 23 is located at one end of the second segment 20 close to the first segment 10. A material of the second extension segment 23 is also the same as a material of the second segment 20, and the second extension segment 23 and the second segment 20 may also be prepared and obtained synchronously. In this way, after reaching the second end 12, the electrical signal transmitted on the first segment 10 further continues to be transmitted toward the first extension segment 13. The first extension segment 13 may cooperate with the second extension segment 23, and after an electrical signal is transmitted to the second extension segment 23, the second extension segment 23 transmits the electrical signal to the second segment 20.

Refer to the schematic diagram of FIG. 12*a*. In this embodiment, the connector 30 is constructed as a fixing member 33, and the fixing member 33 is insulated. The fixing member 33 is disposed on one side of the first power branch line 110, to fix the first extension segment 13 and the second extension segment 23, and implement signal transmission between the first extension segment 13 and the second extension segment 23. The fixing member 33 is located on one side of the first power branch line 110. To be specific, the fixing member 33 is located on one side of the first segment 10 and the second segment 20. In this case, the first extension segment 13 and the second extension segment 23 may simultaneously extend toward a direction of the fixing member 33, and are fixed to each other with the fixing member 33. This enables the first extension segment 13 and the second extension segment 23 to cooperate to implement a transmission function of an electrical signal. Insulation of the fixing member 33 can ensure that the fixing member 33 does not interfere with electrical performance of the first extension segment 13 and the second extension segment 23, thereby ensuring reliable transmission of an electrical signal.

It may be understood that, after the fixing member 33 is fixedly connected relative to the first power branch line 110 from one side of the first power branch line 110, an extension direction of the first extension segment 13 is different from an extension direction of the second segment 20. An included angle needs to be formed between the extension direction of the first extension segment 13 and the extension direction of the first segment 10, to ensure that the first extension segment 13 and the fixing member 33 located on one side of the first segment 10 are cooperative. Correspondingly, an extension direction of the second extension segment 23 should be parallel to an extension direction of the first extension segment 13, or an included angle between the extension direction of the second extension segment 23 and the extension direction of the first extension segment 13 is limited to be less than a specific range (for example, less than or equal to 30 degrees). In this way, the first extension segment 13 and the second extension segment 23 can form a reliable cooperation relationship, and transmission of an electrical signal between the first extension segment 13 and the second extension segment 23 is ensured. It is defined that the fixing member 33 is fixed at a position on one side of the first power branch line 110 along the first direction 001. In an implementation, the first extension segment 13 may extend along the first direction 001, and the second extension segment 23 may also extend along the first direction 001. The first extension segment 13 and the second extension segment 23 separately mate with the fixing member 33 and are fixed to each other.

In this embodiment, the first extension segment 13 is actually bent relative to the first segment 10, the second extension segment 23 is also bent relative to the second segment 20, and extension directions of the first extension segment 13 and the second extension segment 23 are parallel or form a relatively small included angle range. The fixing member 33 separately holds the first extension segment 13 and the second extension segment 23 in a bending direction (the first direction 001) of the first extension segment 13 and the second extension segment 23, to ensure that signal transmission is implemented between the first extension segment 13 and the second extension segment 23 through cooperation.

In a possible implementation, an included angle formed between the first direction 001 and the extension direction of the first segment 10 is 90 degrees. To be specific, the first extension segment 13 extends toward one side perpendicular to the first segment 10. In this case, the second extension segment 23 may also extend along the first direction 001, and the second extension segment 23 also extends toward one side and perpendicular to the second segment 20. A bending angle between the first extension segment 13 and the first segment 10 is equal to a bending angle between the second extension segment 23 and the second segment 20. Therefore, when an electrical signal is transmitted from the first segment 10 to the first extension segment 13, a path bending angle of the electrical signal is 90 degrees. When the second extension segment 23 receives an electrical signal transmitted by the first extension segment 13 and transmits the electrical signal to the second segment 20, a path bending angle of the electrical signal is also 90 degrees. In addition, bending angles of the two paths are symmetric to each other. Such a structure helps maintain consistency of signal transmission between the first extension segment 13 and the first segment 10 and between the second extension segment 23 and the second segment 20.

FIG. 13 is a schematic diagram of a structure of a fixing member 33 according to this disclosure. The fixing member 33 includes a body 333, the body 333 is provided with a first through hole 331 and a second through hole 332. The first through hole 331 and the second through hole 332 separately penetrate the body 333. The first through hole 331 and the first extension segment 13 are disposed in a matching manner, and the second through hole 332 and the second extension segment 23 are also disposed in a matching manner. Therefore, the first extension segment 13 may extend into the body 333 from the first through hole 331, so that a relative position of the first extension segment 13 relative to the fixing member 33 is fixed (refer to FIG. 14). Correspondingly, the second extension segment 23 may also extend into the body 333 from the second through hole 332, so that a relative position of the second extension segment 23 relative to the fixing member 33 is fixed. Because the first through hole 331 and the second through hole 332 are separately provided in the body 333, a relative position of the first through hole 331 and the second through hole 332 is fixed. In this case, a relative position of the first extension segment 13 extending into the first through hole 331 and the second extension segment 23 extending into the second through hole 332 is also fixed to each other, to implement a signal transmission function.

In an embodiment, the body 333 is further provided with an accommodating cavity 3331, and the accommodating cavity 3331 is located on one side of the first through hole 331. The accommodating cavity 3331 is further communicated with the first through hole 331 and the second through hole 332 at the same time. With reference to FIG. 14, when the fixing member 33 is fixed relative to the first power branch line 110, the accommodating cavity 3331 is further located on one side of the first through hole 331 away from the first segment 10.

In the schematic diagram of FIG. 14, a length of the first extension segment 13 is greater than an extension length of the first through hole 331, so that the first extension segment 13 partially extends out of the first through hole 331, and is at least partially accommodated in the accommodating cavity 3331. A part extending out of the first through hole 331 is defined as the first connection end 131. To be specific, the first connection end 131 is located, along the first direction 001, on one side of the body 33 away from the first power branch line 110. Correspondingly, a length of the second extension segment 23 is also greater than an extension length of the second through hole 332, and the second extension segment 23 includes a second connection end 231 located on one side of the body 33 away from the first power branch line 110. It may be understood that the second connection end 231 is also at least partially accommodated in the accommodating cavity 3331.

The first extension segment 13 and the second extension segment 23 implement transmission of an electrical signal through cooperation between the first connection end 131 and the second connection end 231. In addition, because both the first connection end 131 and the second connection end 231 are in an exposed state relative to the body 333, no interference of another medium is introduced between the first connection end 131 and the second connection end 231. This helps implement impedance matching between the first extension segment 13 and the second extension segment 23.

In an embodiment, the first connection end 131 and the second connection end 231 are conducted through welding. In this case, an electrical signal path is formed between the first connection end 131 and the second connection end 231, and the electrical signal on the first segment 10 is directly transmitted to the second extension segment 23 through the first extension segment 13, and is further conducted to the second segment 20. In another embodiment, the first connection end 131 and the second connection end 231 may alternatively be conducted in a lapping manner, and an electrical signal is directly transmitted between the first extension segment 13 and the second extension segment 23.

Because the accommodating cavity 3331 accommodates both the first connection end 131 and the second connection end 231, a solder connected between the first connection end 131 and the second connection end 231 can also be accommodated in the accommodating cavity 3331, to prevent the solder from flowing out of the body 333 and lapping with an external line. It may be understood that, when the solder is connected between the first connection end 131 and the second connection end 231, the solder may further be configured to abut against the body 333, and prevent the fixing member 33 from falling off from the first power branch line 110 after sliding toward one side of the first connection end 131.

Refer to the schematic diagram in FIG. 14*a*. Both the first segment 10 and the second segment 20 are located on a first plane 111. A thickness direction of the first segment 10 extends along a direction perpendicular to the first plane 111, and a thickness direction of the second segment 20 also extends along a direction perpendicular to the first plane 111. Further, the first direction 001 is also located on the first plane 111. In this case, after being bent relative to the first segment 10, the first extension segment 13 is also located on the first plane 111. Correspondingly, after being bent relative to the second segment 20, the second extension segment 23 is also located on the first plane 111. In this case, mating surfaces between the first connection end 131 and the second connection end 231 are respectively planes (two shaded surfaces in FIG. 14*a*) in thickness directions of the first connection end 131 and the second connection end 231. With this structure, an area of relative matching between the first connection end 131 and the second connection end 231 is relatively small, and a volume of solder required for conducting the first connection end 131 and the second connection end 231 through welding is also relatively small.

In some other embodiments, refer to a strip line 100 shown in FIG. 15 from another observation angle. A buckle 334 is further disposed on the fixing member 33. The buckle 334 is configured to implement a fixed connection between the fixing member 33 and the first power branch line 110. The buckle 334 extends out toward one side of the body 333 along an extension direction of the first through hole 331. In addition, in an embodiment in which the accommodating cavity 3331 is disposed in the body 333, the buckle 334 and the accommodating cavity 3331 are further disposed separately on two sides of the first through hole 331. A fixing portion 3341 is disposed on one side of the buckle 334 away from the body 333. When the fixing member 33 is located on one side of the first power branch line 110, the body 333 is attached to one side of the first power branch line 110, and the buckle 334 extends toward a direction of the first power branch line 110 away from the body 333. This enables the fixing portion 3341 to abut against a surface of the first power branch line 110 away from the body 333, thereby preventing the fixing member 33 from sliding along the extension direction of the first through hole 331 and falling off from the first extension segment 13.

The buckle 334 may be elastic to some extent. This enables that during sliding relative to the first power branch line 110, the fixing portion 3341 circumvents an outer contour of the first power branch line 110 through elastic deformation of the buckle 334, and restores a shape of the fixing portion 3341 after the fixing portion 3341 is located on one side of the first power branch line 110 away from the body 333, thereby abutting against the first power branch line 110. It may be understood that the fixing portion 3341 may abut against any part of the first segment 10 and/or the second segment 20, so that a position between the fixing member 33 and the first power branch line 110 is fixed. In some embodiments, a plurality of buckles 334 may alternatively be provided. The plurality of buckles 334 are separately fixedly connected to the body 333, and the plurality of buckles 334 correspondingly form a plurality of fixing portions 3341, to abut against the first power branch line 110 from different positions, thereby ensuring effective holding of the fixing member 33 and the first power branch line. It may be understood that, in some other embodiments, the fixing member 33 may alternatively be held with the first power branch line 110 in any form such as binding or adhesive, to limit a relative position of the first extension segment 13 and the second extension segment 23.

The suspended strip line 300 in this disclosure does not limit a specific shape of the fixing member 33. The fixing member 33 may be constructed as a cylindrical shape as shown in FIG. 13. To be specific, the body 333 is constructed as a cylindrical structure. In this case, the accommodating cavity 3331 may also be constructed as a cylindrical cavity, and wall thicknesses of all positions at an edge of the accommodating cavity 3331 are consistent. The fixing member 33 may alternatively be constructed as a cuboid structure as shown in FIG. 15. To be specific, the body 333 is constructed as a cuboid. In this case, the accommodating cavity 3331 may also be constructed as a rectangular cavity, and wall thicknesses of all positions at an edge of the accommodating cavity 3331 are also consistent.

The first extension segment 13 and the second extension segment 23 may further implement signal transmission through coupling. Refer to embodiments shown in FIG. 16 and FIG. 17. FIG. 16 is a top view of a position of the fixing member 33, and FIG. 17 is a schematic cross-sectional view of a position of the fixing member 33. The first connection end 131 and the second connection end 231 are spaced apart to form capacitance, and coupled transmission of an electrical signal is implemented through two opposite outer surfaces (surfaces shown by dotted lines in FIG. 16 and FIG. 17) of the first connection end 131 and the second connection end 231. In the embodiments of FIG. 16 and FIG. 17, the first direction 001 is preferably disposed perpendicular to the first plane 111. In this case, the two opposite outer surfaces of the first connection end 131 and the second connection end 231 are two outer surfaces in respective line width directions. A mating area between the first connection end 131 and the second connection end 231 is larger, and a better coupling effect can be implemented.

In an embodiment, a distance between the first connection end 131 and the second connection end 231 may be controlled by setting a distance between the first through hole 331 and the second through hole 332, to ensure a capacitance value between the first connection end 131 and the second connection end 231 and reduce a signal loss when the first connection end 131 and the second connection end 231 are coupled. For example, the distance between the first connection end 131 and the second connection end 231 is controlled to be less than or equal to 0.5 mm and greater than or equal to 0.1 mm.

In an embodiment, a line width d1 of the first extension segment 13 is less than or equal to the line width D1 of the first segment 10, and is also less than or equal to the line width D2 of the second segment 20. A line width d2 of the second extension segment 23 is also less than or equal to the line width D1 of the first segment 10, and is also less than or equal to the line width D2 of the second segment 20. Therefore, the line width d1 of the first connection end 131 and the line width d2 of the second connection end 231 are also correspondingly less than or equal to the line width D1 of the first segment 10 and the line width D2 of the second segment 20. Such setting can ensure that when the first connection end 131 transmits a signal to the second connection end 231, impedance of the first connection end 131 can match impedance of the first segment 10 and impedance of the second segment 20 separately.

In some embodiments, it may be set that the line width d1 of the first extension segment 13 is equal to the line width d2 of the second extension segment 23, and the line width D1 and the line width D2 between the first segment 10 and the second segment 20 are also equal, to improve consistency of overall line widths of the first power branch line 110.

The foregoing descriptions are merely specific embodiments of this disclosure, but are not intended to limit the protection scope of this disclosure. Any variation or replacement, for example, reducing or adding a mechanical part, and changing a shape of a mechanical part, readily figured out by a person skilled in the art within the technical scope disclosed in this disclosure shall fall within the protection scope of this disclosure. When no conflict occurs, embodiments of this disclosure and features in embodiments may be mutually combined. Therefore, the protection scope of this disclosure shall be subject to the protection scope of the claims.

What is claimed is:

1. A component of a radio frequency function device, comprising a cavity and a strip line, wherein the strip line is located in the cavity, and is insulated from the cavity;

wherein the strip line comprises a signal processing line, a plurality of power branch lines, and a connector, the signal processing line having one end conducted to a signal source and another end electrically connected to the plurality of power branch lines separately;

wherein the plurality of power branch lines comprise a first power branch line including a first segment and a second segment that are disconnected from each other, one end of the first segment being electrically connected to the signal processing line, the second segment being located at one end of the first segment away from the signal processing line, wherein the connector is located between the first segment and the second segment, to implement signal transmission between the first segment and the second segment; and wherein the component further comprises a sliding medium which is accommodated in the cavity, and the sliding medium is enabled to implement a phase adjustment function by sliding.

2. The component of claim 1, wherein the connector is conductive and comprises a connection segment, a first pin, and a second pin, the first pin and the second pin are separately disposed at two ends of the connection segment, the first pin is fixed relative to the first segment and the second pin is fixed relative to the second segment, and the first pin and the second pin separately implement signal transmission between the first segment and the second segment in a conduction or coupling manner.

3. The component of claim 2, wherein a line width of the connection segment is less than or equal to a line width of the first segment and a line width of the second segment.

4. The component of claim 1, wherein the component further comprises a first substrate and a second substrate that are relatively fixed, both the first substrate and the second substrate are substrates of a printed circuit board, the signal processing line and the first segment are located on the first substrate, and the second segment is located on the second substrate.

5. The component of claim 1, wherein the first segment comprises a first extension segment, and the first extension segment is located at one end of the first segment away from the signal processing line; and the second segment comprises a second extension segment, and the second extension segment is located at one end of the second segment close to the first segment; and the connector is insulated, the connector is disposed on one side of the first power branch line, and the connector is configured to fix the first extension segment and the second extension segment, and implement signal transmission between the first extension segment and the second extension segment.

6. The component of claim 5, wherein the first extension segment and the second extension segment separately extend along a first direction, and the first direction and an extension direction of the first segment form an included angle.

7. The component of claim 6, wherein the connector comprises a body, a first through hole provided on the body and a second through hole provided on the body, the first through hold and the second through hold, the body is fixedly connected to the first power branch line, the first through hole is configured to accommodate the first extension segment, and the second through hole is configured to accommodate the second extension segment.

8. The component of claim 7, wherein the first extension segment comprises a first connection end extending out of the first through hole, the second extension segment comprises a second connection end extending out of the second through hole, and the first connection end and the second connection end implement signal transmission between the first segment and the second segment in a conduction or coupling manner.

9. The component of claim 8, wherein the first connection end and the second connection end are conducted through welding, the body is further provided with an accommodating cavity, the accommodating cavity is located at a side of the first through hole away from the first segment, and the accommodating cavity is configured to communicate the first through hole with the second through hole and accommodate the first connection end and the second connection end.

10. The component of claim 8, wherein the first connection end and the second connection end are coupled to implement signal transmission, the first segment is formed on a first plane, and the first direction is perpendicular to the first plane.

11. The component of claim 5, wherein a line width of the first extension segment is less than or equal to a line width of the first segment and a line width of the second segment; and a line width of the second extension segment is less than or equal to the line width of the first segment and the line width of the second segment.

12. A radio frequency function device, comprising a suspended strip line, the suspended strip line including a cavity and a strip line that is located in the cavity and is insulated from the cavity;

wherein the strip line comprises a signal processing line, a plurality of power branch lines, and a connector, the signal processing line having one end conducted to a signal source and another end electrically connected to the plurality of power branch lines separately;

wherein the plurality of power branch lines comprise a first power branch line including a first segment and a second segment that are disconnected from each other, one end of the first segment being electrically connected to the signal processing line, the second segment being located at one end of the first segment away from the signal processing line, wherein the connector is located between the first segment and the second segment, to implement signal transmission between the first segment and the second segment; and wherein the radio frequency function device further comprises a sliding medium which is accommodated in the cavity, and the sliding medium is enabled to implement a phase adjustment function by sliding.

13. The device of claim 12, wherein the radio frequency function device is a phase shifter, a coupler, a filter, a remote electrical tilt device, or an antenna.

14. The radio frequency function device of claim 12, wherein the connector is conductive and comprises a connection segment, a first pin, and a second pin, the first pin and the second pin are separately disposed at two ends of the connection segment, the first pin is fixed relative to the first segment and the second pin is fixed relative to the second segment, and the first pin and the second pin separately implement signal transmission between the first segment and the second segment in a conduction or coupling manner.

15. The radio frequency function device of claim 14, wherein a curve segment is further disposed in the connection segment, the curve segment bends along an extension path from the first pin to the second pin.

16. A base station, comprising a radio frequency function device with a suspended strip line, wherein the suspended strip line includes a cavity and a strip line that is located in the cavity and is insulated from the cavity;

wherein the strip line comprises a signal processing line, a plurality of power branch lines, and a connector, the signal processing line having one end conducted to a signal source and another end electrically connected to the plurality of power branch lines separately;

wherein the plurality of power branch lines comprise a first power branch line including a first segment and a second segment that are disconnected from each other, one end of the first segment being electrically connected to the signal processing line, the second segment being located at one end of the first segment away from the signal processing line, wherein the connector is located between the first segment and the second segment, to implement signal transmission between the first segment and the second segment; and wherein the radio frequency function device further comprises a sliding medium which is accommodated in the cavity, and the sliding medium is enabled to implement a phase adjustment function by sliding.

17. The base station of claim 16, wherein the connector is conductive and comprises a connection segment, a first pin, and a second pin, the first pin and the second pin are separately disposed at two ends of the connection segment, the first pin is fixed relative to the first segment and the second pin is fixed relative to the second segment, and the first pin and the second pin separately implement signal transmission between the first segment and the second segment in a conduction or coupling manner.

18. The base station of claim 17, a curve segment is further disposed in the connection segment, the curve segment bends along an extension path from the first pin to the second pin.

* * * * *